US007758411B2

(12) United States Patent
Crawford, III et al.

(10) Patent No.: US 7,758,411 B2
(45) Date of Patent: Jul. 20, 2010

(54) SYSTEM AND METHOD FOR PROVIDING AN ELECTRONIC POKER GAME

(75) Inventors: James T. Crawford, III, Charlotte, NC (US); Gehrig Henderson White, Charlotte, NC (US)

(73) Assignee: PokerTek, Inc., Matthews, NC (US)

( * ) Notice: Subject to any disclaimer, the term of this patent is extended or adjusted under 35 U.S.C. 154(b) by 859 days.

(21) Appl. No.: 10/993,505

(22) Filed: Nov. 19, 2004

(65) Prior Publication Data

US 2006/0058088 A1 Mar. 16, 2006

Related U.S. Application Data

(60) Provisional application No. 60/610,262, filed on Sep. 16, 2004.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ............................ 463/13; 463/22; 463/31; 463/37; 463/30

(58) Field of Classification Search .................. 463/13, 463/30, 22, 31, 37

See application file for complete search history.

(56) References Cited

U.S. PATENT DOCUMENTS

| | | | |
|---|---|---|---|
| 4,052,057 | A | 10/1977 | Castle |
| 4,516,777 | A | 5/1985 | Nikora |
| 4,611,808 | A | 9/1986 | Palmer |
| 4,614,342 | A | 9/1986 | Takashima |
| 4,743,022 | A | 5/1988 | Wood |

(Continued)

FOREIGN PATENT DOCUMENTS

| | | |
|---|---|---|
| JP | 2004174026 | 6/2004 |

(Continued)

OTHER PUBLICATIONS

Pacific Poker: "Joining A Waiting List"; Internet Portal of Pacific Poker, Jun. 22, 2004; XP002361353; URL: http:// web.archive.org/web/20040622085221/http://www.pacificpokercom/>; retrieved on Jan. 3, 2006.

(Continued)

*Primary Examiner*—John M Hotaling, II
*Assistant Examiner*—Adetokunbo Torimiro
(74) *Attorney, Agent, or Firm*—Womble, Carlyle, Sandridge & Rice, PLLC

(57) ABSTRACT

An electronic poker table and method provide an electronic poker game to a plurality of players. The electronic poker table includes a table having a table top with a playing surface, a plurality of electronic player interaction areas located around a periphery of the table top, and a game computer. Each electronic player interaction area provides a player interface for interaction with one of the players. Each player interface has a rabbit button. At least one hand of the electronic poker game is administered using virtual cards. A winner for the at least one hand is determined and a pot is awarded to the winner. The hand includes at least one common card and, after the winner has been determined, a player may view any undealt common cards by actuating the rabbit button.

10 Claims, 10 Drawing Sheets

U.S. PATENT DOCUMENTS 4,760,527 A 7/1988 Sidley
4,926,327 A 5/1990 Sidley
4,948,134 A 8/1990 Suttle et al.
5,014,991 A 5/1991 Mirando et al.
5,019,973 A 5/1991 Wilcox et al.
5,022,653 A 6/1991 Suttle et al.
5,033,744 A 7/1991 Bridgeman et al.
5,042,818 A 8/1991 Weingardt
5,046,736 A 9/1991 Bridgeman et al.
5,100,137 A 3/1992 Fulton
5,149,104 A 9/1992 Edelstein
5,159,549 A 10/1992 Hallman
5,167,413 A 12/1992 Fulton
5,188,363 A 2/1993 Marnell, II
5,224,706 A 7/1993 Bridgeman et al.
5,242,163 A 9/1993 Fulton
5,249,800 A 10/1993 Hilgendorf et al.
5,251,897 A 10/1993 Fulton
5,255,915 A 10/1993 Miller
5,259,613 A 11/1993 Marnell, II
5,275,400 A 1/1994 Weingardt et al.
5,277,424 A 1/1994 Wilms
5,294,120 A 3/1994 Schultz
5,308,065 A 5/1994 Bridgeman et al.
5,332,219 A 7/1994 Marnell, II et al.
5,332,228 A 7/1994 Schultz
5,342,047 A 8/1994 Heidel et al.
5,356,140 A 10/1994 Dabrowski et al.
5,377,973 A 1/1995 Jones et al.
5,393,057 A 2/1995 Marnell, II
5,401,023 A 3/1995 Wood
5,407,199 A 4/1995 Gumina
5,411,257 A 5/1995 Fulton
5,415,404 A 5/1995 Joshi et al.
5,423,539 A 6/1995 Nagao
5,470,079 A 11/1995 LeStrange et al.
5,476,259 A 12/1995 Weingardt
5,505,461 A 4/1996 Bell et al.
5,511,781 A 4/1996 Wood et al.
5,531,440 A 7/1996 Dabrowski et al.
5,636,843 A 6/1997 Roberts
5,639,088 A 6/1997 Schneider et al.
5,669,817 A 9/1997 Tarantino
5,685,774 A 11/1997 Webb
5,695,402 A 12/1997 Stupak
5,707,285 A 1/1998 Place et al.
5,755,621 A 5/1998 Marks et al.
5,772,506 A 6/1998 Marks et al.
5,788,574 A 8/1998 Ornstein et al.
5,794,964 A 8/1998 Jones et al.
5,803,809 A 9/1998 Yoseloff
5,806,855 A 9/1998 Cherry
5,816,914 A 10/1998 Wichinsky
5,816,915 A 10/1998 Kadlic
5,816,916 A 10/1998 Moody
5,823,873 A 10/1998 Moody
5,836,818 A 11/1998 Jones et al.
5,851,011 A 12/1998 Lott
5,853,325 A 12/1998 Kadlic
5,868,618 A 2/1999 Netley et al.
5,868,619 A 2/1999 Wood et al.
5,876,283 A 3/1999 Parra et al.
5,882,259 A 3/1999 Holmes, Jr. et al.
5,882,260 A 3/1999 Marks et al.
5,902,184 A 5/1999 Bennett
5,902,983 A 5/1999 Crevelt et al.
5,908,353 A 6/1999 Andrews
5,913,726 A 6/1999 Jones et al.
5,947,821 A 9/1999 Stone
5,947,822 A 9/1999 Weiss
5,951,397 A 9/1999 Dickinson
5,957,774 A 9/1999 Holmes, Jr. et al.
5,975,528 A 11/1999 Halaby
5,984,779 A 11/1999 Bridgeman et al.
6,007,066 A 12/1999 Moody
6,007,424 A 12/1999 Evers et al.
6,012,719 A 1/2000 Webb
6,036,601 A 3/2000 Heckel
6,039,648 A 3/2000 Guinn et al.
6,045,129 A 4/2000 Cooper et al.
6,050,568 A 4/2000 Hachquet
6,056,641 A 5/2000 Webb
6,068,552 A 5/2000 Walker et al.
6,070,878 A 6/2000 Jones et al.
6,093,100 A 7/2000 Singer et al.
6,098,985 A 8/2000 Moody
6,110,040 A 8/2000 Sanduski et al.
6,113,492 A 9/2000 Walker et al.
6,126,542 A 10/2000 Fier
6,129,632 A 10/2000 Luciano
6,135,882 A 10/2000 Kadlic
6,135,883 A 10/2000 Hachquet
6,135,884 A 10/2000 Hedrick et al.
6,146,271 A 11/2000 Kadlic
6,149,157 A 11/2000 Suan
6,149,521 A 11/2000 Sanduski
6,159,095 A 12/2000 Frohm et al.
6,165,069 A * 12/2000 Sines et al. .................. 463/12
6,179,711 B1 1/2001 Yoseloff
6,319,122 B1 1/2001 Packes, Jr. et al.
6,190,254 B1 2/2001 Bennett
6,196,547 B1 3/2001 Pascal et al.
6,203,429 B1 3/2001 Demar et al.
6,203,430 B1 3/2001 Walker et al.
6,206,780 B1 3/2001 Awada
6,220,959 B1 4/2001 Holmes, Jr. et al.
6,220,960 B1 4/2001 Kryzhanovsky
6,227,969 B1 5/2001 Yoseloff
6,234,897 B1 5/2001 Frohm et al.
6,237,916 B1 5/2001 Webb
6,248,016 B1 6/2001 Walker et al.
6,257,979 B1 7/2001 Walker et al.
6,270,404 B2 8/2001 Sines et al.
6,270,405 B1 8/2001 Ferguson
6,273,820 B1 8/2001 Haste, III
6,293,866 B1 9/2001 Walker et al.
6,299,170 B1 10/2001 Yoseloff
6,299,534 B1 10/2001 Breeding et al.
6,312,333 B1 11/2001 Acres
6,312,334 B1 11/2001 Yoseloff
6,322,445 B1 11/2001 Miller
6,332,839 B2 12/2001 Walker et al.
6,334,613 B1 1/2002 Yoseloff
6,342,007 B1 1/2002 Wood et al.
6,343,988 B1 2/2002 Walker et al.
6,343,989 B1 2/2002 Wood et al.
6,358,144 B1 3/2002 Kadlic et al.
6,368,214 B1 4/2002 Luciano
6,368,216 B1 4/2002 Hedrick
6,371,851 B1 4/2002 Singer et al.
6,379,245 B2 4/2002 De Keller
6,382,628 B2 5/2002 Stern
6,386,973 B1 5/2002 Yoseloff
6,398,645 B1 6/2002 Yoseloff
6,406,023 B1 6/2002 Rowe
6,409,174 B1 6/2002 Demarest
6,416,406 B1 7/2002 Duhamel
6,416,407 B1 7/2002 Carrico et al.
6,419,578 B1 7/2002 Moody et al.
6,422,940 B1 7/2002 Walker et al.
6,443,456 B1 9/2002 Gajor
6,454,266 B1 9/2002 Breeding et al.
6,454,651 B1 9/2002 Yoseloff
6,457,714 B1 10/2002 Feola

| | | | | |
|---|---|---|---|---|
| 6,467,771 | B1 | 10/2002 | deKeller | |
| 6,478,675 | B1 | 11/2002 | Awada | |
| 6,491,298 | B1 | 12/2002 | Criss-Puszkiewicz et al. | |
| 6,511,068 | B1 | 1/2003 | Sklansky et al. | |
| 6,517,074 | B1 | 2/2003 | Moody et al. | |
| 6,517,437 | B1 | 2/2003 | Wells et al. | |
| 6,530,842 | B1 | 3/2003 | Wells et al. | |
| 6,536,768 | B2 | 3/2003 | Caputo | |
| 6,537,150 | B1 | 3/2003 | Luciano et al. | |
| 6,544,120 | B2 | 4/2003 | Ainsworth | |
| 6,558,253 | B1 | 5/2003 | DeSimone et al. | |
| 6,561,897 | B1 | 5/2003 | Bourbour et al. | |
| 6,561,898 | B2 | 5/2003 | Moody | |
| 6,565,088 | B2 | 5/2003 | Perrie et al. | |
| 6,565,432 | B2 | 5/2003 | Moody | |
| 6,568,680 | B1 | 5/2003 | Moody et al. | |
| 6,569,013 | B1 | 5/2003 | Taylor | |
| 6,569,014 | B2 | 5/2003 | Walker et al. | |
| 6,575,467 | B1 | 6/2003 | Kal | |
| 6,585,587 | B2 | 7/2003 | Falciglia, Sr. | |
| 6,589,115 | B2 | 7/2003 | Walker et al. | |
| 6,592,456 | B2 | 7/2003 | Walker et al. | |
| 6,612,926 | B1 | 9/2003 | Dabrowski | |
| 6,616,142 | B2 | 9/2003 | Adams | |
| 6,626,757 | B2 | 9/2003 | Oliveras | |
| 6,629,889 | B2 | 10/2003 | Mothwurf | |
| 6,651,985 | B2 | 11/2003 | Sines et al. | |
| 6,652,377 | B1 | 11/2003 | Moody | |
| 6,656,040 | B1 | 12/2003 | Brosnan et al. | |
| 6,656,044 | B1 | 12/2003 | Lewis | |
| 6,656,052 | B2 | 12/2003 | Abramopoulos et al. | |
| 6,659,863 | B2 | 12/2003 | Ashley et al. | |
| 6,659,866 | B2 | 12/2003 | Frost et al. | |
| 6,672,959 | B2 | 1/2004 | Moody et al. | |
| 6,702,667 | B2 | 3/2004 | Mattice et al. | |
| 6,705,943 | B2 | 3/2004 | Awada | |
| 6,708,975 | B1 | 3/2004 | Fox et al. | |
| 6,712,694 | B1 | 3/2004 | Nordman | |
| 6,722,974 | B2 | 4/2004 | Sines et al. | |
| 6,722,985 | B2 | 4/2004 | Criss-Puszkiewicz et al. | |
| 6,729,620 | B2 | 5/2004 | Jones | |
| 6,729,621 | B2 | 5/2004 | Moody | |
| 6,729,956 | B2 | 5/2004 | Wolf et al. | |
| 6,739,970 | B2 | 5/2004 | Luciano | |
| 6,743,094 | B2 | 6/2004 | Johnson | |
| 6,743,102 | B1 | 6/2004 | Fiechter et al. | |
| 6,749,501 | B2 * | 6/2004 | Crawford | 463/13 |
| 6,752,395 | B2 | 6/2004 | Jones et al. | |
| 6,769,982 | B1 | 8/2004 | Brosnan | |
| 6,800,026 | B2 | 10/2004 | Cannon | |
| 7,264,243 | B2 * | 9/2007 | Yoseloff et al. | 273/292 |
| 2001/0007828 | A1 | 7/2001 | Walker et al. | |
| 2001/0052671 | A1 | 12/2001 | Stern | |
| 2002/0094855 | A1 | 7/2002 | Berman | |
| 2002/0173352 | A1 | 11/2002 | Oliveras | |
| 2003/0032469 | A1 | 2/2003 | Moody et al. | |
| 2003/0064767 | A1 | 4/2003 | Brown | |
| 2003/0070178 | A1 | 4/2003 | Boyd et al. | |
| 2003/0073494 | A1 * | 4/2003 | Kalpakian et al. | 463/42 |
| 2003/0083119 | A1 | 5/2003 | Hogan et al. | |
| 2003/0087685 | A1 | 5/2003 | Hogan et al. | |
| 2003/0107175 | A1 | 6/2003 | Loewenstein et al. | |
| 2003/0153380 | A1 | 8/2003 | Dreaper et al. | |
| 2003/0164590 | A1 | 9/2003 | Moody | |
| 2003/0176211 | A1 | 9/2003 | Sommerville | |
| 2003/0176214 | A1 | 9/2003 | Burak | |
| 2003/0189290 | A1 | 10/2003 | Moody | |
| 2004/0036219 | A1 | 2/2004 | Schibetta | |
| 2004/0082372 | A1 | 4/2004 | Romero | |
| 2005/0032563 | A1 * | 2/2005 | Sines | 463/13 |
| 2005/0082758 | A1 * | 4/2005 | Sklansky et al. | 273/292 |
| 2005/0090304 | A1 | 4/2005 | Crawford et al. | |
| 2005/0277463 | A1 * | 12/2005 | Knust et al. | 463/29 |
| 2006/0052162 | A1 * | 3/2006 | Soukup et al. | 463/27 |

FOREIGN PATENT DOCUMENTS

| | | |
|---|---|---|
| WO | 00/16863 A | 3/2000 |
| WO | 0016863 | 3/2000 |
| WO | 02084556 | 10/2002 |

OTHER PUBLICATIONS

Paradise Poker: "Quick Tour of Paradise Poker"; Internet Citation, Jun. 10, 2004; XP002359402; URL: http://web.archive.org/web/20040610173651/www.paradisepokercom/quick_tour.html>; retrieved on Dec. 15, 2005.

International Search Report PCT/US 2005/031217; received from Patent Cooperation Treaty Jul. 23, 2007; 21 pages.

International Search Report PCT/US 2007/005650; received from Patent Cooperation Treaty Sep. 10, 2007; 16 pages.

European Search Report App No. 05792928.3; received from European Patent Office Aug. 6, 2007; 7 pages.

European Search Report App No. 05794343.3; received from European Patent Office Aug. 6, 2007; 7 pages.

European Search Report App No. 05792685.9; received from European Patent Office Aug. 6, 2007; 7 pages.

European Search Report App No. 05792637.0; received from European Patent Office Aug. 6, 2007; 7 pages.

European Search Report App No. 05792929.1; received from European Patent Office Aug. 6, 2007; 7 pages.

European Search Report App No. 05792604.0; received from European Patent Office Jul. 16, 2007; 8 pages.

European Search Report App No. 05792920.0; received from European Patent Office Jul. 16, 2007; 8 pages.

P&M Poker Table Report & Error Codes (1 page) Jan. 23, 1992.

"Video Poker", http://thewizardofodds.com/games/vidpok.html, Dec. 12, 2001.

P&M Poker Table brochure (2 pages), Reno, Nevada, USA.

* cited by examiner

SYSTEM AND METHOD FOR PROVIDING AN ELECTRONIC POKER GAME

RELATED APPLICATION

This application claims priority to U.S. Provisional Application No. 60/610,262, filed Sep. 16, 2004.

FIELD OF THE INVENTION

The present invention related generally to a system and method for providing an electronic poker game.

BACKGROUND OF THE INVENTION

Gaming is an increasingly popular form of entertainment. Games, particularly, games of change and skill in which one or more players play and place wagers on the outcome thereof may be played in a variety of ways, including at a casino or other venue or on the Internet. Of the various forms of games which are available for play, many are played with playing cards. Of these, poker is arguably the most popular.

Traditionally, poker is played at a table with several players wagering paper or coin money on a series of playing cards dealt from a deck of fifty-two cards. This deck is comprised of four suits at thirteen cards per suit. This form of poker requires a human dealer to coordinate the game, including dealing, wagering, folding, etc . . . . One of the problems with traditional poker is that it suffers from the possibility of human/dealer error. In "social" card games, especially poker, the players take turns acting as the dealer, but in licensed commercial gaming establishments, such as casinos, the dealer is typically a non-playing employee. Thus, another problem associated with traditional poker games in this context is the training and retention of dealers.

One alternative form of gaming, with particular reference to poker, has flourished on the internet. Internet gaming has become quite successful in that it provides many choices for the players. In particular, Internet gaming is fast and convenient, with registration, betting and payouts available from almost any computer with Internet access and with payments typically arranged via a credit card.

Poker or other card games may also be provided by stand-alone machines similar to slot machines.

One major drawback of internet and stand-alone type games is the lack of the human element. Many people prefer to play poker against other players, due in part to the drama associated with "live" gaming. Undoubtedly, an elevated level of competition exists when humans compete directly against one another. In gaming establishments, experienced players are trying to hone strategy and read other players' intentions through their movements and style of play to be more competitive.

Electronic card games, such as electronic poker games, have been provided which allow players to compete against one another, but eliminate the dealer and the physical cards. However, one problem associated with electronic cards is maintaining the confidentiality of each player's cards which are typically displayed on a monitor in close proximity to the player. In general, the prior art deals with this problem by providing some type of shield or other physical barrier. However, these type of devices have several inherent problems, in that they are easy to defeat by positioning oneself where the player's card are viewable. Additionally, these device are bulky and tend to extend upward from the monitor. This detracts from the overall appearance of the environment and may distract the players.

In "flop" type poker games, such as Hold'em Poker or Omaha Poker, each player's hand may consist of a number of hole cards unique to the player, and one or more common or community cards which are dealt face up. Players must make a betting decision or fold before one or more of the community cards are exposed.

If all but one player folds, then the remaining player is the winner of the hand. When this occurs at traditional poker tables with live dealers, the players who have folded occasionally ask the dealer to exposed what one or more of the undealt community cards would have been. This is commonly referred to as "rabbit hunting". This is desirable, from the player's perspective, because it allows them to see if they made the right decision. However, it is generally not allowed on traditional poker tables because it slows down the game.

The present invention is aimed at one or more of the problems set forth above.

SUMMARY OF THE INVENTION

In one aspect of the present invention, an electronic poker table provides an electronic poker game to a plurality of players. The electronic poker table includes a table having a table top with a playing surface, a plurality of electronic player interaction areas located around a periphery of the table top, and a game computer. Each electronic player interaction area provides a player interface for interaction with one of the players. Each player interface has a rabbit button. The game computer is coupled to the plurality of electronic player interaction areas for administering at least one hand of the electronic poker game using virtual cards, determining a winner for the at least one hand and awarding a pot to the winner. The game computer deals at least one common card and, after the winner has been determined, allows any player to view any undealt common cards in response to actuation of the rabbit button.

In another aspect of the present invention, a method provides an electronic poker game on a plurality of electronic player interface areas and a game computer. Each electronic player interaction area provides a player interface for interaction with one of the players. Each player interface includes a rabbit button. The game computer is coupled to the plurality of electronic player interaction areas. The method includes the steps of administering at least one hand of the electronic poker game using virtual cards and determining a winner for the at least one hand and awarding the winner a pot. The at least one hand includes at least one common card. After the winner has been determined, any player may view any undealt common cards by actuating their rabbit button.

In still another aspect of the present invention, a method provides an electronic poker game on an electronic poker table to a plurality of players. The electronic poker table includes a table, a plurality of electronic player interface areas, and a game computer. The table has a playing surface. The electronic player interaction areas are located around a periphery of the table top. Each electronic player interaction area provides a player interface for interaction with one of the players. Each player interface includes a rabbit button. The game computer is coupled to the plurality of electronic player interaction areas. The method includes the steps of administering at least one hand of the electronic poker game using virtual cards and determining a winner for the at least one hand and awarding the winner a pot. The at least one hand includes at least one common card. After the winner has been determined, any player may view any undealt common cards by actuating their rabbit button.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF INVENTION

Figure 1:
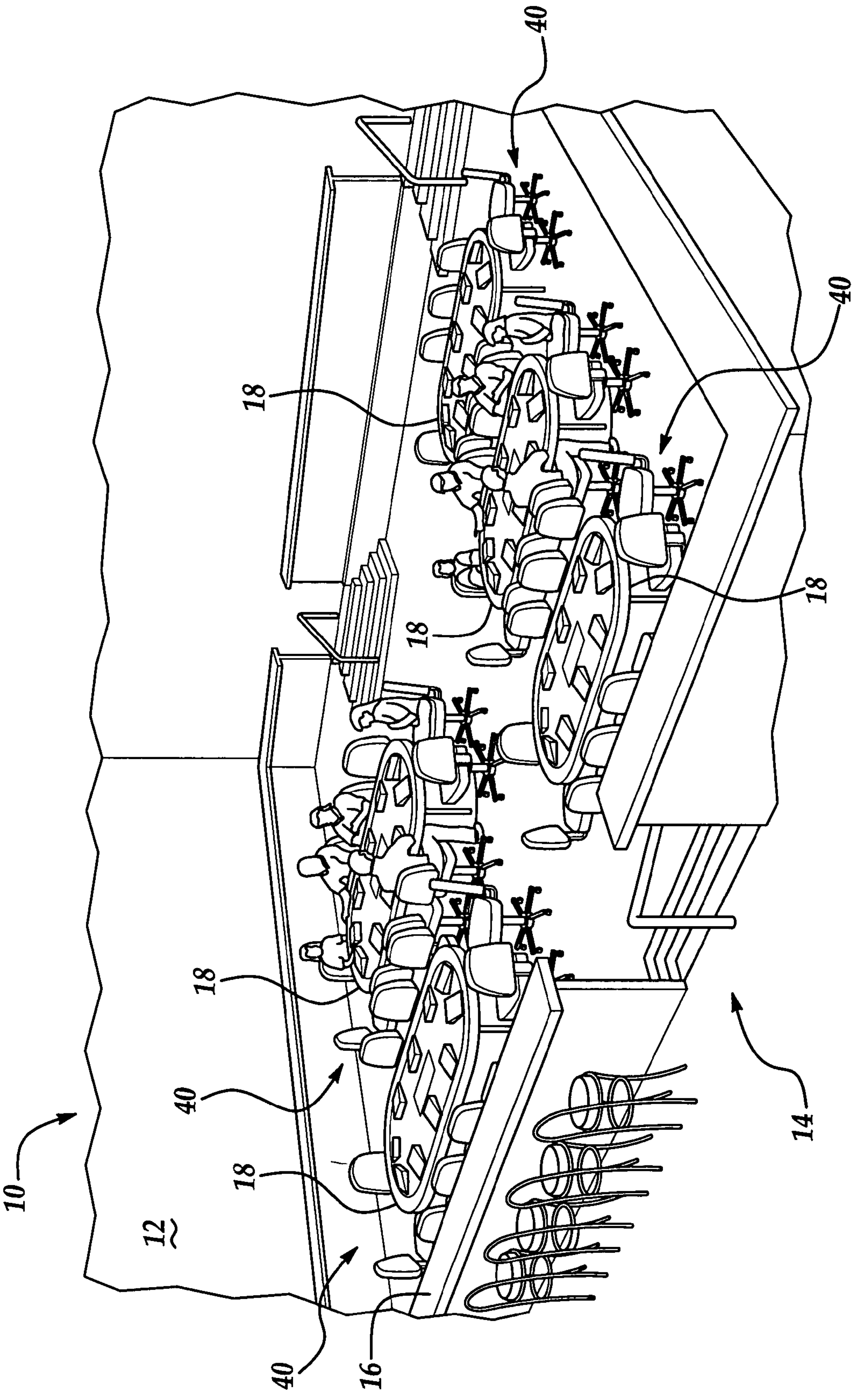
FIG. 1 is a diagrammatic illustration of a system for providing an electronic poker game on one or more electronic poker tables, according to an embodiment of the present invention.

With reference to the drawings and in operation, the present invention relates generally to a system 10 and method for providing, and being related to, electronic poker. With specific reference to FIG. 1, the system 10 is designed to be situated in a gaming environment, such as a casino 12. Typically, such gaming environments 12 are a specialized or designated area within the casino 12, such as a poker room or poker area 14, which has been cordoned off by, for example, a railing 16. While the above refers to one possible implementation or location in which the system 10 may be used, the present invention is not limited to any such location or implementation.

In the illustrated embodiment, the system 10 utilizes electronic chips and electronic playing cards to provide an automated poker game for play by one or more players. In one aspect of the present invention, a human dealer is not required. The system 10 may handle all dealer functions.

The system 10 may be used to play any variation or version of poker. However, for the purposes of discussion, the system 10 will be described as adapted for use in implement the version of poker known as, Texas Hold'em.

In one aspect of the present invention, the system 10 may handle assigning players to a seat, providing electronic chips, accepting wagers, and assigning a pot to the winning player. The system 10 electronically shuffles a set of electronic playing cards and deals the electronic playing cards to the player and any common cards to the table 18. The system 10 may also handle wagering, folding, calling by the players and may restrict such, based on whose turn it is.

In another aspect of the present invention, the poker tables 18 in the system 10 are networked and connected to one or more servers (see below). The server may be used to implement and facilitate, player tracking, ticket in ticket out (cashless) wagering, assigning player's to a seat at a particular table, tournament play, table set-up (including turning the tables on and off and modifying table parameters), and progressive jackpots.

As shown in the illustrated embodiment, the system 10 includes a plurality of electronic poker tables 18. In the embodiment shown in FIG. 1, the system 10 includes ten electronic poker tables 18A-18J, although the present invention is not limited to a specific number of electronic poker tables.

Figure 2:
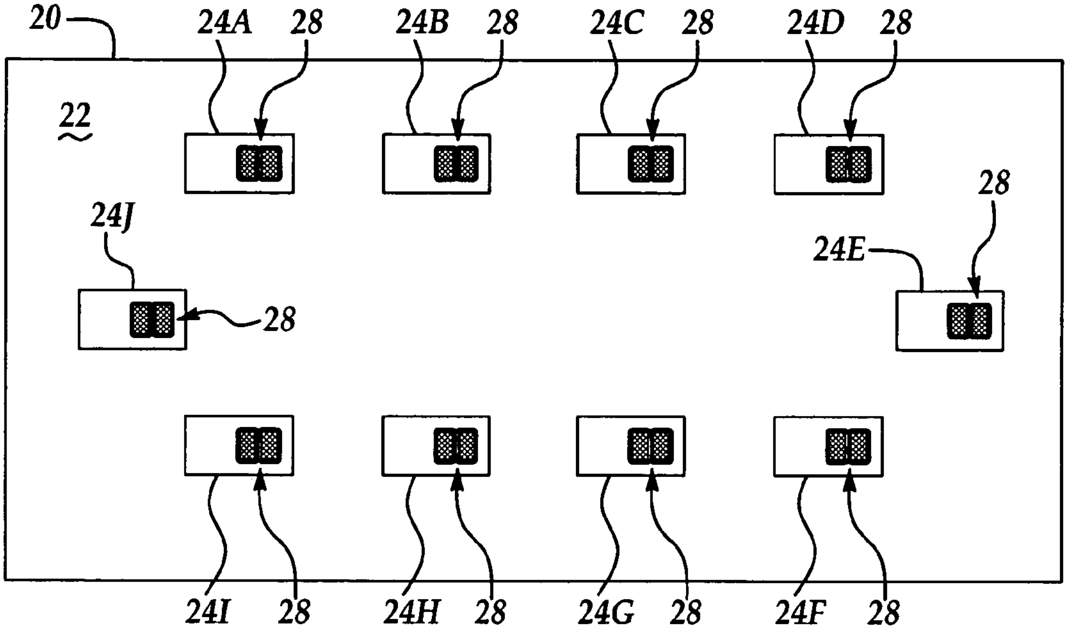
FIG. 2 is a simplified diagram of a table top of the electronic poker tables of FIG. 1, according to an embodiment of the present invention.
Figure 3:
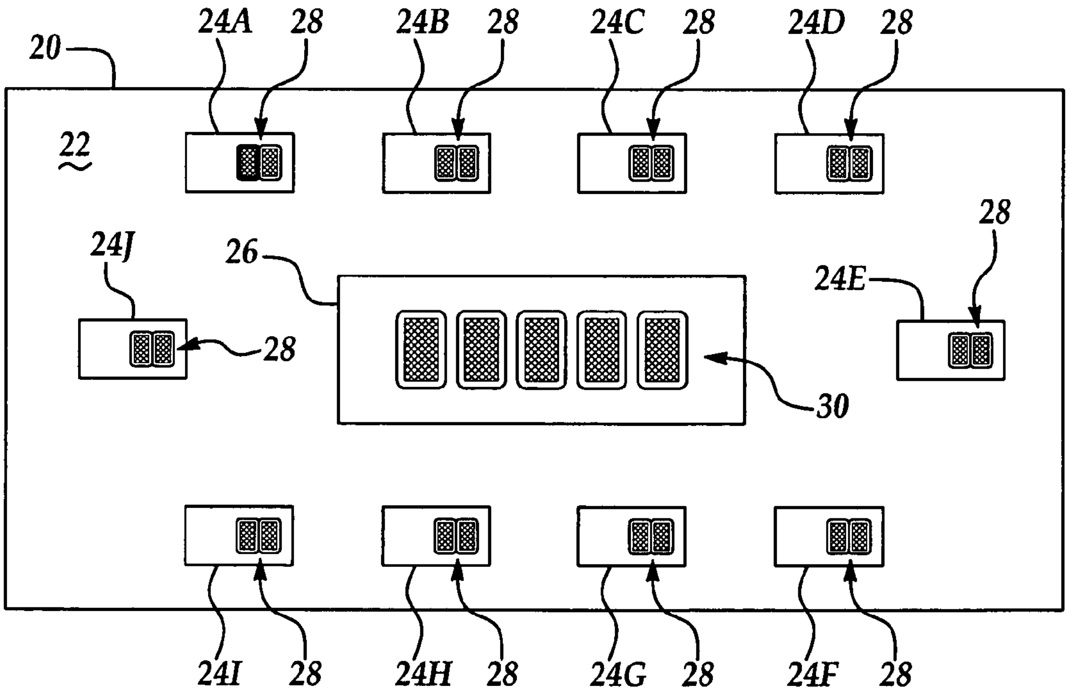
FIG. 3 is a simplified diagram of a table top of the electronic poker tables of FIG. 1, according to another embodiment of the present invention.

A simple representative layout of a table top 20 of the poker tables 18, according to first and second embodiments of the present invention are shown in FIGS. 2 and 3, respectively.

In the top view of the table top 20 shown in FIG. 2, the table top 20 includes a playing surface 22 and a plurality of electronic player interaction areas 24. In the illustrated embodiment, the poker tables 18 are able to seat a maximum of ten players at a time, and thus, includes ten electronic player interaction areas 24A-24J.

In the top view of the table top 20 shown in FIG. 3 (in which like elements are labeled with the same reference numbers), the table top 20 includes a playing surface 22 and a plurality of electronic player interaction areas (EPIA) 24. In the illustrated embodiment, the poker tables 18 are able to seat a maximum often players at a time, and thus, includes ten electronic player interaction areas 24A-24J. The table top 10 also includes a central or common display area (CDA) 26.

In one embodiment, the individual electronic player interaction areas 24A-24J are used to convey game information directly to a player assigned to a specific player interaction area 24A-24J and to implement a player user interface (see below) to effectuate interaction or input from the player. The central or common display area 26 is used to display information to all of the players.

For example in one embodiment, the system 10 is used to play the version of poker known as Texas Hold'em. In Texas Hold'em, each player is dealt a number of cards, e.g., two cards, face down. These are known as a player's "hole" cards 28. A number of cards, e.g., three or five, are dealt face-up and displayed in the common display area 26. These are known as the common cards 30. A player's hand, thus, consists of the player's hole cards 28 and the common cards 30. Whichever player's hand makes the highest poker hand is the winner of that round or hand of poker.

In one aspect of the present invention, the hole cards 28 are displayed face-down on the respective electronic player interaction area 24 and the common cards are displayed in the central display area 26. The hole cards 28 are displayed at a first predetermined ratio and the common cards 30 are displayed at a second predetermined ratio. The first and second predetermined ratios may be expressed as a ratio of a standard size playing card or a predetermined default size. In one embodiment, the first and second ratios are the same. In another embodiment, the first and second ratios are different. For example, the first and second ratios may be defined such that the common cards 30 are displayed larger than the hole cards 28.

Figure 6:
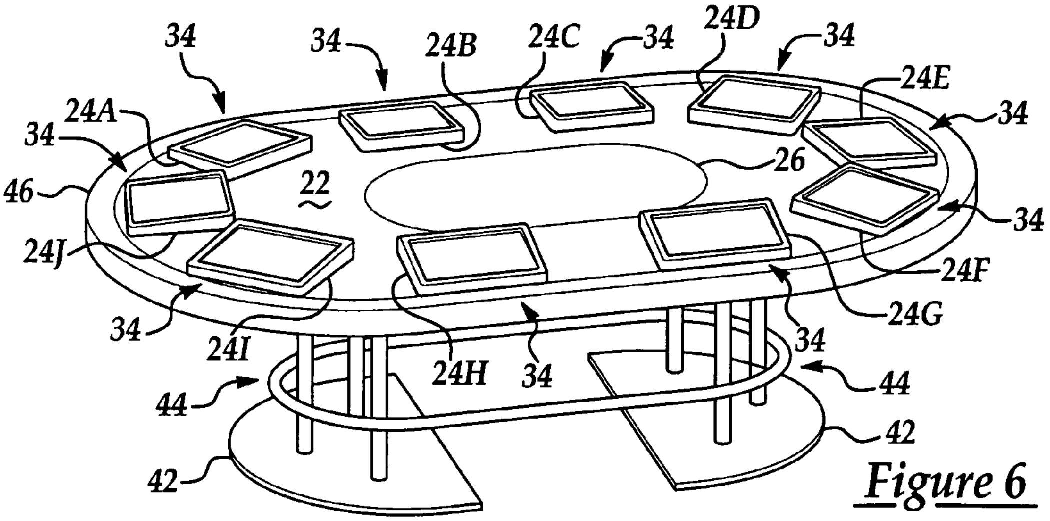
FIG. 6 is a diagrammatic illustration of an electronic poker table, according to an embodiment of the present invention.
Figure 7:
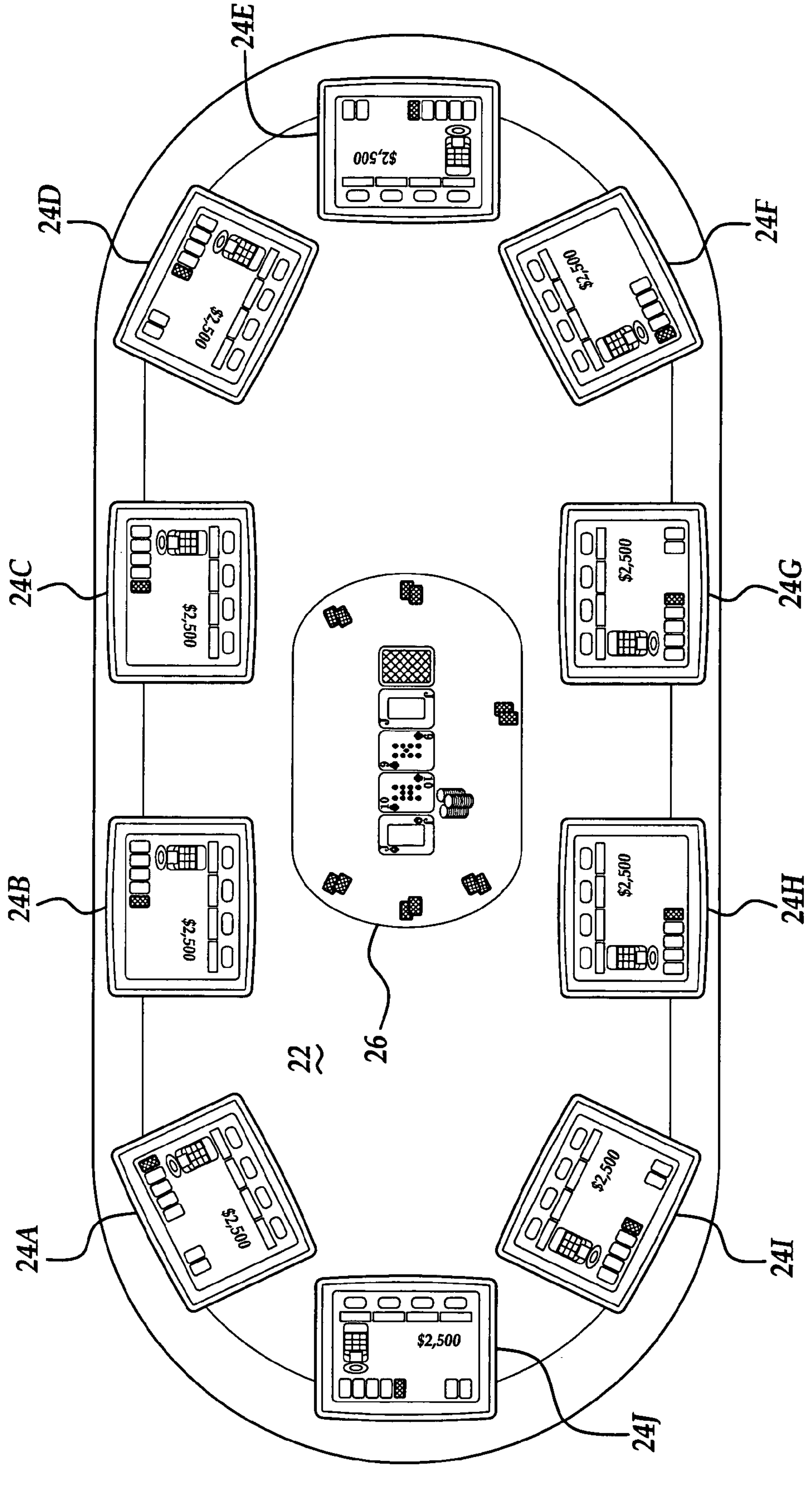
FIG. 7 is a top view of the electronic poker table of FIG. 6.
Figure 8:
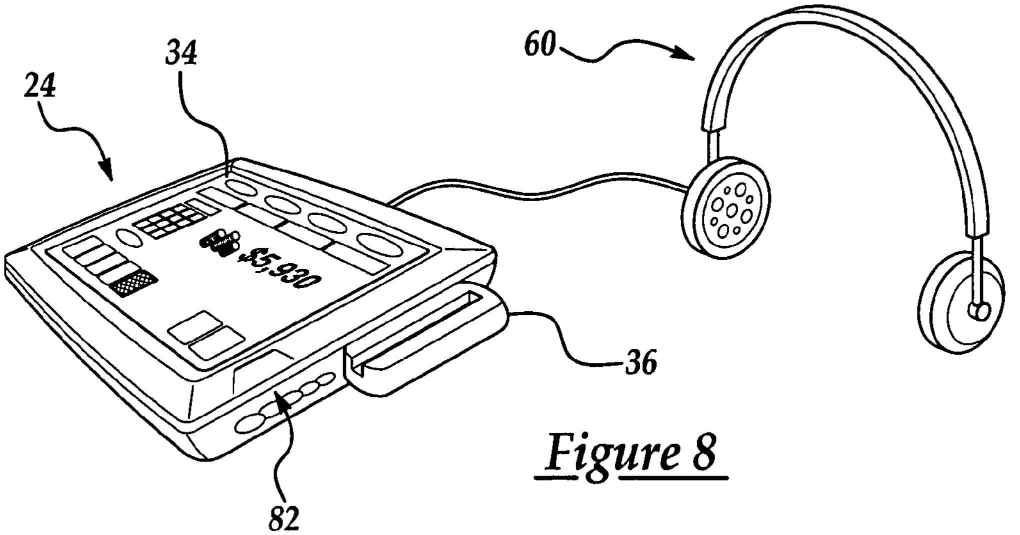
FIG. 8 is a diagrammatic illustration of a module of the electronic poker table of FIG. 6, according to an embodiment of the preset invention.
Figure 11:
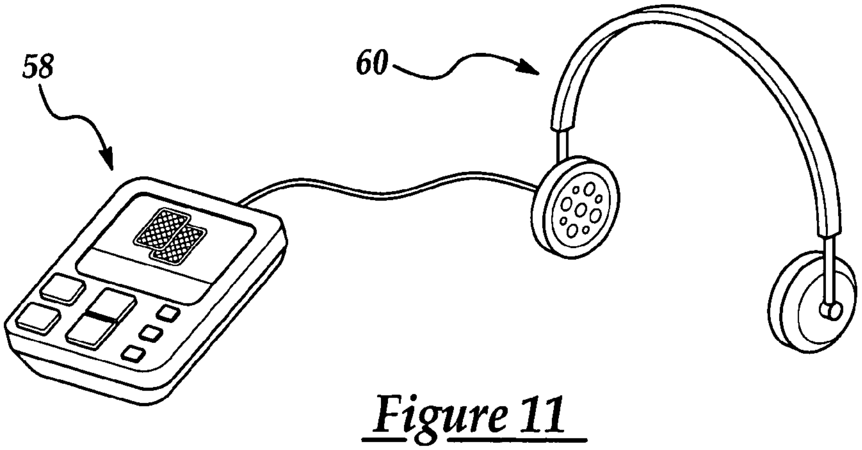
FIG. 11 is a representation of an electronic player interaction area of the system of FIG. 1 embodied in a hand-held device.

With reference to FIGS. 6, 7, and 8 in one embodiment, the electronic player interaction areas 24 are implemented using separate display devices, such as touchscreen displays 32. Each display 32 may be housed in a removable module 34.

The module 34 may incorporate a fully-functional computer. The computer includes a processor capable of running an operating system, such as Windows XP or Windows CE, both available from Microsoft Corporation of Redmond, Wash. In one embodiment, the module 34 includes a card reader 36 for reading a player ID card (not shown).

In the illustrated embodiment, the modules 34 are mounted into the table top 20, such that the touchscreen display 32 is parallel to the table top 20. However, the touchscreen display 32 may be mounted at an angle with respect to the table top 20. Alternatively, the modules 34 may be adjustable to provide a adjustable viewing angle of the touchscreen display 32.

In one embodiment, the central display area 26 is implemented in a separate display 38, such as a LCD or plasma monitor or similar device.

The remainder of the table top may be covered in a material such as felt, or more specifically, green, blue, or red felt. Logos, game information, or other information may be printed on the material.

In an alternative embodiment, the electronic player interaction areas 24 and the central display area 26 may be implemented in a single display which covers a large portion of the table top. The electronic player interaction areas 24 and the central display area 26 may be set apart from the rest of the table top 20 by virtual borders. The areas of the display around the electronic player interaction areas 24 and the central display area 26 may be used to simulate the table top of a standard poker table, e.g., an image of material, such as green felt, may be displayed. Furthermore, logos, game information, other information, advertisements, announcements, pictures, videos, or other information may be displayed, rotated, cycled, or displayed for a limited period of time on the table top 20.

As discussed below, the system 10 and poker tables 18, although electronic, are designed to convey and retain the overall sense and ambience of a standard poker room with non-electrical poker tables. Each electronic poker table 18 is surrounded by a number of poker chairs 40. The number of poker chairs 40 being equal to the number of electronic player interaction areas 24 on the electronic poker table 18.

With particular reference to FIGS. 6 and 7, in the illustrated embodiment the poker tables 18 have an oval shape and may seat a maximum number of players. For example, the poker tables 18 may be sized to seat a maximum of 2-10 players, although the present invention is not limited to any particular sized poker table. As stated above the table top is covered, in between the electronic player interface area, and the central or common display area if provided, by material, such as green felt, or simulation thereof. The poker table includes two bases 42 to which one or more legs 44 are connected. The legs 44 support the table top. A rail or bumper 46 encircles the outer circumference of the table top 20.

Figure 4:
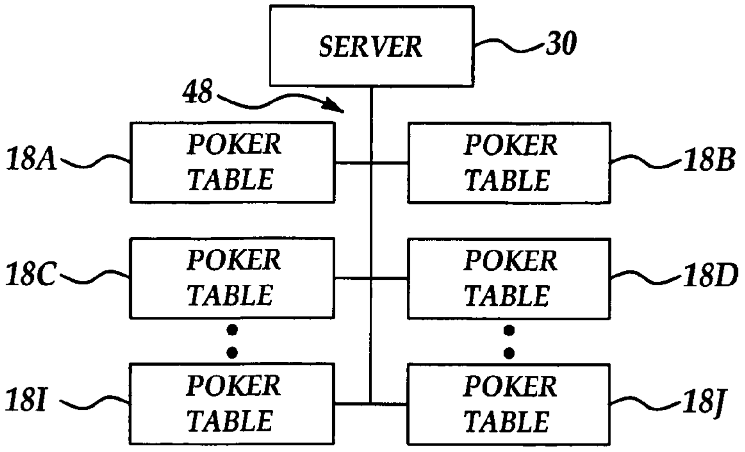
FIG. 4 is a block diagram of the system of FIG. 1, according to an embodiment of the present invention.
Figure 5:
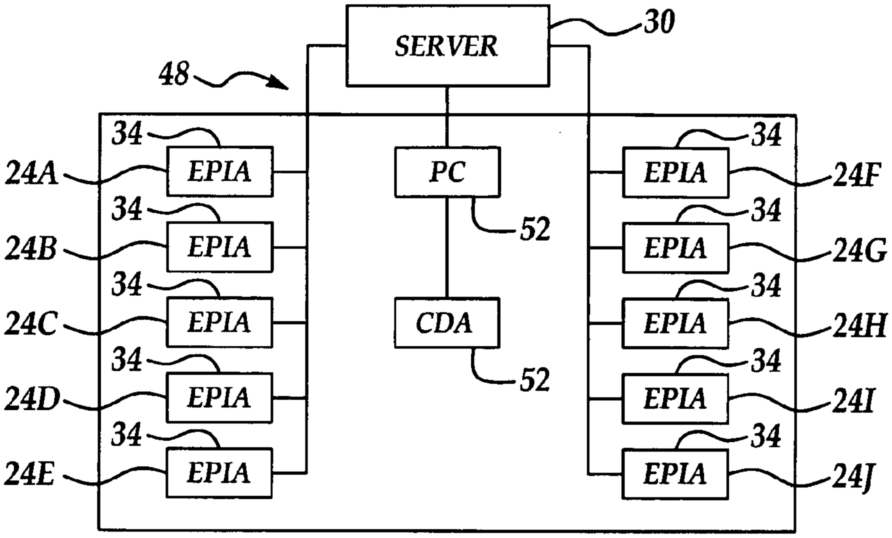
FIG. 5 is a second block diagram of the system of FIG. 1, including the element of an electronic poker table, according to an embodiment of the present invention.

With specific reference to FIGS. 4 and 5, as discussed above the system 10 may include one or more electronic poker tables 18. In one aspect of the present invention, the poker tables 18 are networked together using, e.g., an Ethernet network 48. One or more server 50 may be used to provide functionality for the system 10. For example, the server 50 may be used to implement various functions, including, but not limited to:

- data and player tracking,
- cashless wagering,
- defining and modifying table parameters, including, turning the tables 18 on and off, setting the poker game being played at the table 18, setting wager parameters, etc . . . ,
- defining and managing jackpots, including the a house percentage, i.e., the rake,
- defining and managing progressive jackpots,
- establishing and managing a queue for players and assigning players to seats and/or specific tables from the queue, and
- establishing and managing tournament play, including assigning player seats, collapsing tables, etc. . . . .

With particular reference to FIG. 5, in one embodiment each table 18 includes ten electronic player interface areas 24 which are implemented in a computer based module 34. Each module 34 operates or runs on an operating system, such as Microsoft Windows XP or Windows CE. Each module 34 is connected to the server 50 through the network 48. As shown, another computer 52, such as a personal computer running on Windows XP, may also be connected to the server 50 through the network 48. The primary function of the PC 52 may be to control and drive the central display area 28.

In one embodiment, the server 50 runs the poker games on each of the tables 18. The primary function of the modules 34 is to run the electronic player interface areas 34, to display and run a user interface.

In another embodiment, the poker game or portions of the poker game may be executed or run by the modules 34 and/or the computer 52.

In another aspect of the present invention, the system 10 will implement a player-account based cash in/cash out system. The system 10 will create a user account for each player. Once an account is established for the player, the player is issued a Player Card having an associated personal identification number or PIN. Once the player has been issued a Player Card, their account may be funded. The Player Card is used to identify the player at the tables 18. The player may fund their account by bringing cash to a cage, where the cash is accepted and credited to the player's account. Printed receipts are given to the player and maintained by the casino 12. To bring electronic chips to the table 18, the player sits down at a seat, swipes their Player Card and enters their PIN. The system 10 informs the player of their account balance and allows them to convert all or a portion of the account balance to electronic chips to bring to the game.

From a software perspective, the system 10 may be implemented using six program groups: a table server, a game engine, a table client, a player client, a table manager, and a cage manager. The table server implements the network communication, control and authentication as well as inter-table functions (seat reservations, multi-table tournaments). The game engine is responsible for all game functions, e.g., electronic playing card deck generation, dealing, betting, determining winners and awarding pots. The table client is the graphical control for the central data area 26. The player client implements the user interface for the electronic player interface areas 24 and the logic for capturing player input and communication the player input to the table client server. The table manager contains the user interface for setting user, network, and game parameters, for starting, pausing, and stopping games, and for monitoring game activity and responding to system or user generated alerts. The cage manager provides the ability to create and fund player accounts and to create the Player Cards.

Figure 9:
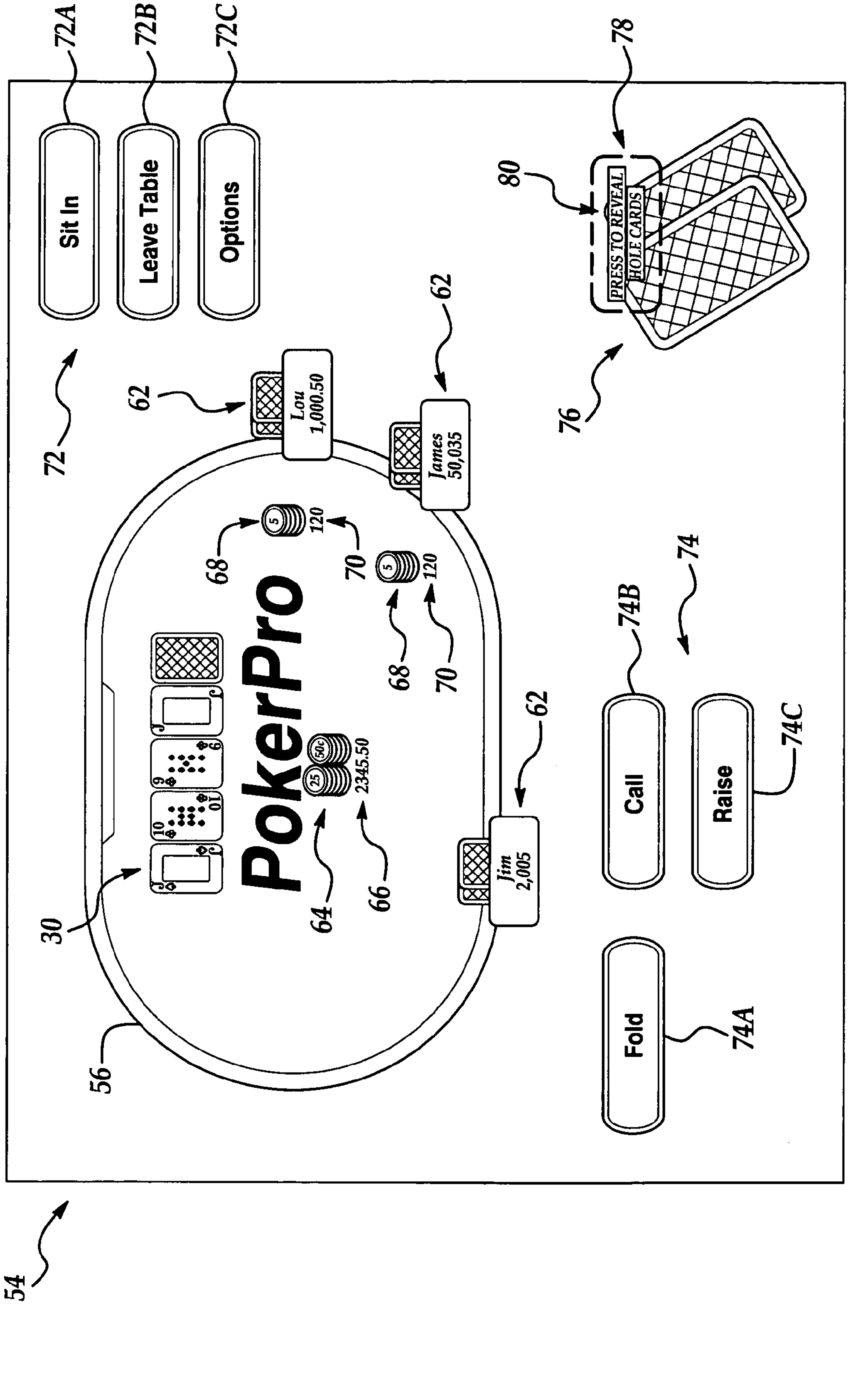
FIG. 9 is a representation of a first screen shot displayed on an electronic player interaction area of the system of FIG. 1, according to an embodiment of the present invention.
Figure 10:
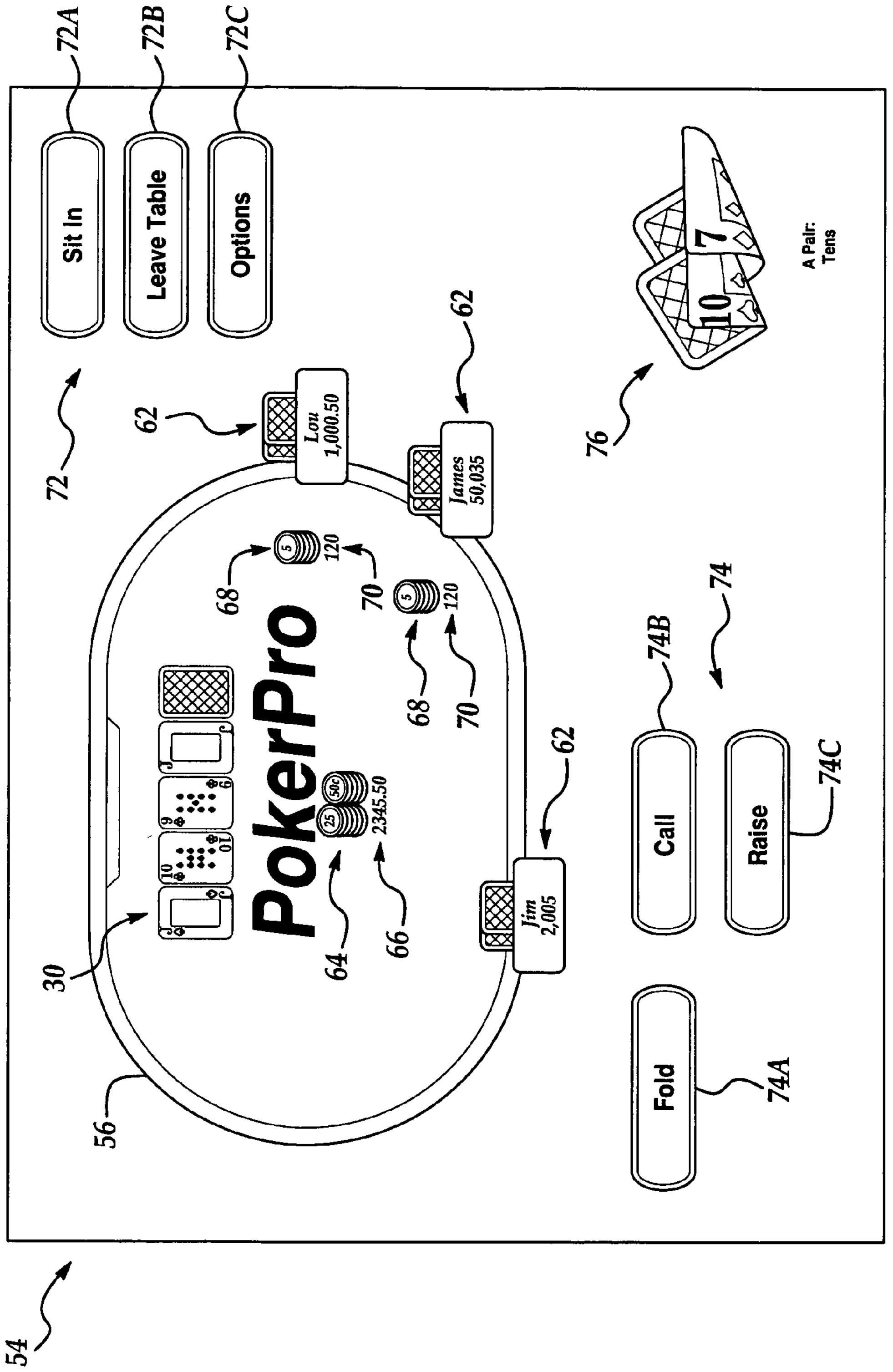
FIG. 10 is a representation of a second screen shot displayed on an electronic player interaction area of the system of FIG. 1, according to an embodiment of the present invention.

With reference to FIGS. 9 and 10, each electronic player interface area 24 implements a player interface 54. The player interfaces 54 may be implemented on the table top 20 (see above), or in the module 34. In another embodiment, the player interface 54 may be implemented on a hand-held device 58, such as a personal data assistant (PDA).

The player interface 52 may be graphical in nature (as shown in FIGS. 9 and 10), or may take other forms, such as a simple textual format. In one embodiment the electronic player interface areas 24 provide the player with the option of choosing between several player interfaces 52, such as a graphical representational of an electronic poker table 56 or the text interface.

Returning to FIGS. 9 and 10, in one embodiment the player interface 54 includes a graphical representation of a poker table 56. Each player in the poker game may be represented by a user graphic or icon 62, which may list their names as well as their chip totals. The pot of the current hand may be represented in the center of the poker table 56 by stack(s) of chips 64 and/or a number 66 representing the value of the current pot. Each player's contribution to the pot may be represented by stack(s) of chips 68 and/or a number 70 adjacent their user graphic 62.

The player interface 54 may also includes a series of player option buttons 72 and a series of game buttons 74. The player option buttons 72 may include, for example, a sit in button 72A, a leave table button 72B, and an options button 72C. Generally, only one of the sit in button 72A and the leave table button 72B would be active at any time. The options button 72C allows the player to access an option menu or screen (not shown) which allow the player to modify certain parameters of the player interface 54, such as, for example, to choose between different formats of the player interface 54. The series of game buttons 74 allow the player to signal their game play decisions to the system 10 during the play of the game. The game buttons 74 may include a fold button 74A, a call button 74B and a raise button 74C. These typically would only be active when it is a player's turn in the poker game. In one embodiment, the buttons 72 are implemented on the touch screen display devices 32. In an alternative embodiment, the buttons 72 are embodied in electromechanical switches or buttons (not shown).

In one embodiment, the player interface 34 may also include the community cards 30. Other information which may be displayed on the player interface include, but is not limited to indicator of the player whose turn it is, a total of chips for each player, any cards of the other players which are face-up, and/or messages to the player, such as advertising.

Figure 12:
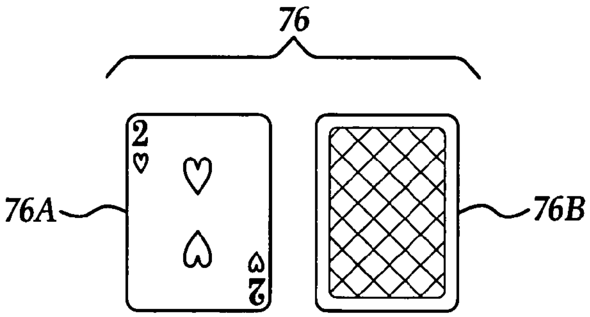
FIG. 12 is a representation of a front side and a back side of an electronic playing card.

In another aspect of the present invention, the player interface 54 includes a graphical representation of one or more of electronic playing cards 76 (see FIG. 12). Each electronic playing card 76 has a front side 76A and a back side 76B. The back side 76B of each card has an identical pattern or image such that the cards cannot be told apart when viewing the back side 76B. The electronic playing card 76 is typically one of a set or deck of standard playing cards. The deck may be a standard deck of 52 cards, each card having a value. The value being two components: the first component being one of a two through ACE and the second component being one of four suits (hears, diamonds, clubs, spades). The value of each card is indicated on the front side 76A of each playing card 76.

The image displayed on the back side 76B of the playing cards may be a logo, a random image (chosen from a set of predetermined images), or may be advertising directed at the player. The image may include a video. In one embodiment, the image displayed on the back side 76B of the playing cards may be cycled through a set of predetermined images. The image may be selectable by a user, who may be the player or an employee of the casino.

In one embodiment, the electronic playing card or cards 76 are a player's hole card(s) in an electronic poker game. However, the electronic playing 76 cards may be used in any sort of electronic card game in which it is desirable to controllably display/hide the player's cards. Thus, while the present invention may be described below in the context of an electronic poker game (and more specifically, with respect to a player's hole cards in a Hold'em style poker game), the present invention is not limited to such a card game.

In a playing card game with physical cards, in which the player's card are dealt "face-down" and not revealed to any other player, the player may look at their cards, while attempting to keep the cards secret from the other players in several ways. For example, the player may lift the cards close to their bodies, spread them out, and shield them with their hands, so only the player can see the front side of their cards. Or the player may leave the cards face down on the table and lift one side or corner revealing at least a portion of the front side, while shielding the cards with their hands.

A controller, which is either, the module 34, the personal computer 52, the hand-held device 58, the server 50 or a combination thereof, controls the player interface 54, i.e., controls the information components of the player interface 54 displayed on the electronic player interaction areas 24, detects touches on the touch screen display devices 32 (when utilized) and interprets the touches as trigger or touch events (see below). As discussed below, the controller 24, 52, 58, 50 may control the display or obscuring (hiding) of the player's hole electronic playing card(s) such that the player may controllably display and view the cards, while maintaining them secret from the other players. As if the player was playing with physical playing cards, the player, thus, has the opportunity to shield their cards with their hand or hands prior to them being revealed.

In one aspect of the present invention, each electronic player interaction area 24 is assigned to a player. Once the player is assigned is to a particular seat at a table 18, the associated EPIA 24 may set as inactive or locked and may indicate the assigned player's name. Once the EPIA 24 is locked, the assigned player must login to the EPIA 24 (see below).

Once the player log-ins, the EPIA 24 becomes active and the player interface 54 is displayed. Also, since the EPIA 24 is active, the player may enter or sit-in on the game being player at the table 12 or adjust/modify any available options by actuating the options button 72C.

In one embodiment as discussed above, the EPIAs maybe implemented using a separate or modular computer 34. In one embodiment, the modular computer 34 includes a display 32 which may be a touch-screen display 34. The touch-screen display displays information (text and/or graphics) regarding the play of the game and implements buttons or selectable areas on the EPIA 24 for user input.

A player may log-in to the system 10 or table 18 through the EPIA 24. In one embodiment, the player may log-in to the system using a player tracking card. The player swipes their player tracking card through the card reader 36. The EPIA 10 may also require entry of a PIN into an attached keypad or keypad implemented on the touchpad display device 34. Alternatively or in addition, the player may log-in using a biometric parameter, such as a fingerprint, sensed by a sensor and a RFID card or chip.

In one aspect of the present invention, the EPIA 24 includes a sound generation device which is used to generate sounds audible to the player assigned to the EPIA 24. The sound generation device may be implemented as an earpiece or headphones or one or more speakers. Generated sounds may be categorized as system sound or player sounds. System sounds include sounds which are intended or suitable to be heard by everyone, including other players and non-players. Player sounds include sounds which are intended to be heard, but not necessarily only, by the player. Example, system sounds may include sounds imitating the shuffling of cards, the dealing of cards, chips thrown into the pot, sounds related to the winning of the jackpot. Player sounds may include a reminder or indication of a player's turn or if the game is timed, an indication of the time remaining or that time is running out. Player exclusive sounds are sounds that can or should only be heard by the player and may indicate an audible signal indicating the player's hole cards or the highest hand of the player or a winning percentage associated with the player's hand.

In another aspect of the present invention, the EPIAs 24 may be implemented via a touchscreen display device 32. The devices 32 may be integrated with a computer in a module. Alternatively, the touchscreen devices 32 may be separate devices controlled by separate computers or the computer 52 at the table 18 or the server 50.

In many gaming environments 12, such as a poker room at a casino, a portion or percentage of each pot goes to the house for running the poker game. This portion of the pot is known as the rake. In one embodiment, the amount of the rake corresponding to the current pot is displayed on each EPIA 24. The rake may be shown as an amount in dollars and may include a graphical representation of virtual chips.

In one aspect of the present invention, the system 10 utilizes both virtual or electronic chips and virtual playing cards. In one embodiment, the EPIA 24 may include a graphical representation of the chips and/or a dollar amount indicative of the amount of chips each player at the table has remaining. Additionally, the EPIA 24 may include a graphical representation of the chips and/or a dollar amount indicative of the amount of the current pot. The pot may be shown in the middle of a graphical representation of the poker table.

In one embodiment, each EPIA 24 may also include a graphical representation of the community cards in the middle of the graphical representation of the poker table. Graphical representations of the other player's card may also be shown (face-down during the current hand and face-up at the end of the hand).

As discussed above, system 10 may require that the player log-ins to the EPIAs 18 which is open or to which they have been assigned. The log-in may be accomplished in a variety of ways (see above). Once a player's identity has been established, however, the player can access a player account, purchase chips using an account balance. Additionally, information regarding the player's play at the table may be tracked and recorded to the player's account.

The EPIAs 18 may be provided with an Ear- or head-phone to provide the sounds (see above) or other signals to the player.

In one aspect of the present invention, the sounds provided by the EPIA 24 (see above), are provided using a simulated voice.

In one aspect of the present invention, the system may utilize a cashless system, such as Ticket-In Ticket-Out or "TITO" (see below)

In one embodiment, the system 10 requires that each player has a player account. The player account may have an associated balance which contains a dollar amount based on an amount of money deposited by the player and/or any winnings that they have collected, either through poker or some other game. Once a player has been identified by the EPIA 24, the player may download a dollar amount and purchase chips to play.

Alternatively, a ticket (with for example a barcode), magnetic card, RFID card, or some other media (jointly referred to as a TICKET) may be inserted in the EPIA 24. The TICKET may have an associated value which is either printed and/or encoded thereon or which is associated with the TICKET in the system 10.

Additionally, once the player decides to leave the table 18, any remaining chips they have, may be instantly converted back into dollars and stored in their player account and/or a new Ticket may be generated.

In another aspect of the present invention, each EPIA 24 may provide an indication of whose turn it is to act. If it is the player's turn who is assigned to an EPIA 24, then the EPIA 24 may provide an appropriate signal, such as a icon, either next to their name or anywhere on the EPIA 24, a sound such as a beep or musical tones, and/or a voice message. If it is a another player's turn, the EPIA 24 may indicate whose turn it is by an icon and/or flashing text, e.g., adjacent the player's turn.

As discussed above, the EPIA 24 includes a set of player option buttons 72 which allow the player to take an appropriate action, such as wager, fold, or call, during their turn. In one embodiment, the EPIA 24 only activates those buttons 72 which are appropriate, given the rules of the game being plated, during the current turn. For example, if the maximum number of raise for a particular game have already been made, then the wager or raise button would be inactive. Additionally, all of the buttons 72 will be inactive when it is not the player's turn.

As discussed above, each seat or EPIA 24 is assigned to a particular player. The player may be assigned to a seat off a queue using a queue system or may be assigned by an employee of the casino using the system 10. However, under certain situations, the player may desire to changes seats or move to another table. For example, if another player or players have left the table leaving fewer players at the table and the player does not like to play at a table with that few of players, the player may request through the EPIA 24 another seat assignment.

The present invention includes methods for displaying and/or obscuring a player's hole cards (see above). Additionally or separately, the EPIA 24 may be adapted to provide an indication of the winning percentage based on the player's current hand and the community cards. The winning percentage may be shown textually, e.g., 55%, and/or graphically, e.g., a pie-chart or bar chart. The winning percentage may be triggered and shown using the same trigger event associated with the hole cards. Alternatively, a separate trigger event, such as a touch-event on another location on the EPIA 24 may be used to show the winning percentage.

The present invention includes methods for displaying and/or obscuring a player's hole cards (see above). Additionally or separately, the EPIA 24 may be adapted to provide an indication of the player's current highest hand based on the player's current hand and the community cards. The highest hand may be shown textually, e.g., two-pairs, and/or graphically, pictures of the five cards which make of the highest hand. The highest hand may be triggered and shown using the same trigger event associated with the hole cards. Alternatively, a separate trigger event, such as a touch-event on another location on the EPIA 24 may be used to show the highest hand.

1. Utilizing Surface Acoustic Wave touch screen technology
2. Utilizing Multi Touch touch screen technology
3. Player away feature: Allows a player to press a button to temporarily remove himself from the game. Secure process for returning him to game accounting for missed blinds.
4. User customizable views of the game: Allow many views of the game and method to allow user to select preferred view.
5. Integrated with speakers
6. Method to obscure player pre-selection of one or several bet options: Poker is a sequential game. Situations exist where a player will know what action they want to take prior to it being there turn. Allowing the player to make that decision in advance of their turn in a way that allows players seating close to observe this action would provide an unfair advantage to some players and not others. This feature allows a player to make a pre-selection while observing his hole cards in such a way that other players will not be able to observe that pre-selection.
7. Ability to display live and pre-recorded Video As discussed above, a poker table 18 may include one or more EPIAs 24. For example, each poker table may have 11 seats and accommodate up to 11 players. Each EPIA 24 may have one or more of the features described in IV.

In one embodiment as discussed above, the EPIAs maybe implemented using a separate or modular computer 34. In one embodiment, the modular computer 34 includes a display 32 which may be a touch-screen display 34. The touch-screen display displays information (text and/or graphics) regarding the play of the game and implements buttons or selectable areas on the EPIA 24 for user input.

In one embodiment, the modular computer 34 includes a display 32 which may be a touch-screen display 34. The touch-screen display displays information (text and/or graphics) regarding the play of the game and implements buttons or selectable areas on the EPIA 24 for user input.

In one aspect of the present invention, the table 18 includes a table sound generation device which is used to generate sounds audible to the players. The table sound generation device may be implemented one or more speakers mounted to integral with the table 18. Alternatively, the table sound generation device may include one or more speakers adjacent to or integral with each EPIA 24. Generally, the sound generation device plays system sounds or player sounds which are suitable for every player to hear.

For example, system sounds may include sounds imitating the shuffling of cards, the dealing of cards, chips thrown into the pot, sounds related to the winning of the jackpot. Player sounds may include a reminder or indication of a player's turn or if the game is timed, an indication of the time remaining or that time is running out. Generally, player exclusive sounds will not be player through the player sound generation device.

In one embodiment of the present invention, the poker table 18 includes a central display area 26. As discussed above, the individual electronic player interaction areas 24A-24J are used to convey game information directly to a player assigned to a specific player interaction area 24A-24J and to implement a player user interface to effectuate interaction or input from the player. The central or common display area 26 is used to display information to all of the players.

The common cards 30 are displayed in the central or common display area 26.

In one embodiment, the central display area 26 is implemented in a separate display 38, such as a LCD or plasma monitor or similar device. The remainder of the table top may be covered in a material such as felt, or more specifically, green, blue, or red felt. Logos, game information, or other information may be printed on the material.

As discussed above, the common cards 30 are displayed in a larger size than the hole cards 26 are displayed at a first predetermined ratio and the common cards 30 are displayed at a second predetermined ratio. The first and second predetermined ratios may be expressed as a ratio of a standard size playing card or a predetermined default size. In one embodiment, the first and second ratios are the same. In another embodiment, the first and second ratios are different. For example, the first and second ratios may be defined such that the common cards 30 are displayed larger than the hole cards 28.

In an alternative embodiment, the electronic player interaction areas 24 and the central display area 26 may be implemented in a single display which covers a large portion of the table top. The electronic player interaction areas 24 and the central display area 26 may be set apart from the rest of the table top 20 by virtual borders. The areas of the display around the electronic player interaction areas 24 and the central display area 26 may be used to simulate the table top of a standard poker table, e.g., an image of material, such as green felt, may be displayed. Furthermore, logos, game information, other information, advertisements, announcements, pictures, videos, or other information may be displayed, rotated, cycled, or displayed for a limited period of time on the table top 20.

Typically displays, such as LCD or Plasma monitors are rectangular in form. As shown in Figure, the overlay may be integral with the table top 20 and may include a cut out. The overlay covers the outer edge of the display. Only the portion of the display inside the cut-out is visible. In the illustrated embodiment, the cut out has a shape, such as an oval shape, which is similar to the shape of the table.

As discussed above, the rake is defined as a portion or percentage of each pot that goes to the house for running the poker game. This portion of the pot is known as the rake. In one embodiment, the amount of the rake corresponding to the current pot is displayed on the central display area 26. The rake may be shown as an amount in dollars and may include a graphical representation of virtual chips.

In another aspect of the present invention, the central display area 26 may provide an indication of whose turn it is to act. In one embodiment, the central display area 26 may provide an appropriate signal, such as a icon, e.g., an arrow or other symbol, a sound such as a beep or musical tones, and/or a voice message. This indication of a player's turn may be in addition to the indication on the EPIA 24.

During a poker hand, even at a standard poker table with a human dealer, one of the players is designated as the "dealer", for the purposes of the order in which the playing cards are dealt and in which wagers are made. In one aspect of the present invention, the central display area 26 may provide an indication of which player is designated the "dealer" for the current hand. In one embodiment, the central display area 26 may provide an appropriate signal, such as a icon, e.g., an arrow or other symbol. This indication of a player's turn may be in addition to the indication on the EPIA 24.

As discussed above, the hole cards 28 are displayed face-down on the respective electronic player interaction area 24 and the common cards are displayed in the central display area 26. In one aspect, the common cards 30 are displayed at a larger size than the hole card 28.

In one embodiment, the hole cards 28 are displayed at a first predetermined ratio and the common cards 30 are displayed at a second predetermined ratio. The first and second predetermined ratios may be expressed as a ratio of a standard size playing card or a predetermined default size. In one embodiment, the first and second ratios are the same. In another embodiment, the first and second ratios are different. For example, the first and second ratios may be defined such that the common cards 30 are displayed larger than the hole cards 28.

In one aspect of the present invention, the table 18 provide a poker game, such as Texas Hold'em for the players. In one embodiment, the provided poker game is a timed game, i.e., the player's have a predetermined time period in which to complete each turn. For example, the player's have a set period of 1 minute to complete each turn. Alternatively, the period of time may vary based, e.g., the first turn may have a period of completion of 1 minute, while the second turn may have a shorter or longer period of completion In another aspect of the present invention, the central display 38 may be used to display advertising messages. The advertising messages may be from the casino or third parties and may consist of graphics, pictures, animations, video and/or audio. The advertising may be presented at specific location on the central display 38 and may be varied, based on time, i.e., cycled through a set of advertising messages.

8. Display and/or animation of blinds on Central Display Area 26
9. Display and/or animation of community cards on Central Display Area 26
10. Display and/or animation of bets placed and player chip stacks on Central Display Area 26
11. Indication of players who have folded and not folded on Central Display Area 26
12. Display and animation of winning hands on Central Display Area 26
13. Central Display Area 26 utilizing transducer sound emitting technology eliminating the need for separate speakers
14. Display on Central Display Area 26 of wining hand percentage estimates in situations where all remaining players cards are exposed e.g. remaining players are all in.

In one aspect of the present invention, the poker tables 18 in the system 10 are networked and connected to one or more servers 50. The server 50 may be used to implement and facilitate, player tracking, ticket in ticket out (cashless) wagering, assigning player's to a seat at a particular table, tournament play, table set-up (including turning the tables on and off and modifying table parameters), and progressive jackpots. Each table 18 may have one or more EPIAs 24. The poker tables 18 and the EPIA may have one or more of the features described in VI.A. and VI.B.

In addition, other devices may be connected to the server 50 for providing additional features and/or functions. For example, a queueing system may be provided (see below). This system may be implement using a separate computer which implemented this function. The separate computer may also implement other features or functions of the system. It should be noted, however, that in some systems, these additional features or function could be provided, at least in part, by the server(s) 50.

In one aspect of the present invention, the server 50 runs the games. In other words, the server 50 electronically "shuffles" the playing cards, deals the cards, controls the players' turns, receives the player's inputs and acts accordingly, tracks, manages, and awards the pot, tracks the rake, etc. . . . . Game data is stored in a database. Each input, wager, play, etc. . . . is stored in the database.

In one aspect of the present invention, a queueing system assigning player's to seats at a poker table 18 is provided. The queueing system may also implement a waiting list if there are no seats available. In one embodiment, one or more devices, such as a personal, notebook, or tablet computer, handheld computer, or PDA, is accessible by one or more employees of the casino. The device(s) allow the employee(s) to enter a customer's name or player ID or to swipe the player's ID Card. If there is a seat at a table 18 available, the player may be assigned to the seat.

If there is more than one seat available, in one embodiment the employee, may select one of the seats (with or without input from the player). Alternatively, the device may select the seat using a predetermined set of rules.

If there are no seats available, the player is placed in a queue, until a seat opens up. In one embodiment, players are taken off of the queue and assigned a seat on a first come, first served basis. However, the system 10 may allow the casino to implement special rules for players to bypass the queue or list. For example, the casino may present vouchers to players under certain conditions, such as a win in a tournament, to be placed at the head of a queue.

In one aspect of the present invention, the server 50 provides an interface which allows a user, such as an authorized or designated employee of the casino, to set-up a new table 18 or to modify the parameters of an existing table 18. The interface may be implemented on a server 50 or on another device networked to the server 50.

The interface may provide one or more of the following features: ability to turn a table on/off, and ability to change game parameters, such as the permitted wagers, the game being players, the rake, etc . . . .

In one aspect of the present invention, as stated above the system 10 tracks each transaction, wager, card dealt in a database. The system 10 also tracks the players which are playing at each table 10. This information is stored in the database, summarized, and may be presented in any numerous forms of reporting formats. Any information regarding the player's, the games, and how each hand is played may be tracked. This available data may also be analyzed for purposes of determining the frequency of poker hands (per hour) for a table or all games in which a particular player or players played or detecting, e.g., collusion between players.

As discussed above, in one embodiment every player must belong to a player club and have an assigned player ID card to log-in to an EPIA 24 to player poker at a table 18. Each player has an account in the player tracking club. The player's account in the tracking club tracks the amount of cash or money that the player has available for play at poker. The player's account also tracks the player's play at a poker table 18, including amounts wagered and amounts won.

The system 10 allows jackpots, i.e., progressive jackpots, to be generated by and won across multiple hands and/or multiple tables. A progressive jackpot may increase based on the amounts wagered and/or won at the included tables. The progressive jackpot may continue to increase until won under a set of predetermined conditions. Alternatively, it may be active until only for a predetermined time period. The conditions for winning the jackpot that it is won by one or more players at the end of the time period.

The system 1 allows a progressive jackpot to be funded in multiple ways. The way in which a progressive jackpot is funded may be funded through a computer program application on the server 50 or other device. For example, the progressive jackpot may be funded by taking a set percentage from every jackpot, every other jackpot, or every nth jackpot.

The amount of the progressive jackpot may be displayed on the central display 38 and/or a remote display.

The progressive jackpot may be initiated randomly, under certain defineable conditions, and/or for a specific event, i.e., a marketing event. The progressive jackpot may be a single hand (across multiple hands), a predetermined number of hands at one table or across multiple hands, for a predetermined time period, etc. . . . .

15. Progressive, side-bet, Double-Up, Mystery and many other jackpot techniques are well understood in relation to slot machines. Methods and systems to apply those techniques in combination with an automated poker table.

16. Displaying Gov't Reporting Form in EPIA

In another aspect of the present invention, after a jackpot is won by a player, one or more government reporting forms may be presented to the player on their EPIA 24. The form may accept the player's electronic signature (if permissible) or may notify the player of the requirements and direct them to a location where they can fill out the form. The device may be a personal, notebook, or tablet computer, handheld computer, PDA, or other suitable device.

In one aspect of the present invention, one ore more employees of the casino may be assigned to manage a plurality of tables. One of the employees may manage the queueing system (where provided). A device, networked to the server, may be provided which provides various functions to the employees. The device provides a dashboard application which allows the employee to manage various aspect of the tables 18

In one aspect of the present invention, the employee may view various data related to the current state of a table, including, but not limited to, the players, the pot, wager information, the common cards, etc. . . . .

The employee, for example, in response to an in-person query or a quiry made through an EPIA 24, may view tracked data to look for evidence of collusion between two or more players. For example, the employee may determine if two or more persons at a particular table have a habit of playing at the same time and to determine if there is any pattern discemable in the play which would provide evidence that they are impermissibly working together.

In one aspect of the present invention, each EPIA 24 may provide a player with buttons which summon or direct specific employees of the casino. For example the player may request a host/hostess to order a drink. Additionally, the player may request that an employee review something that occurred or is occurring at the table 18, e.g., possible collusion. This may be done anonymously.

As described above, the device which allows the players to manage the tables 18, may also allow the employee to automatically or manually assign players to particular tables and/or seats and/or EPIA 24.

In one embodiment, the server 50 controls the advertising on the central display 38. Advertising may also be provided on the EPIA's 24 and/or a remote display associated with the poker tables 18. The server 50 may control the content, frequency, and/or the cycling of the advertising.

In one aspect of the present invention, a player may refrain from playing in one or more hands or get up from a table and not play in one or more hands. Typically, however, if the player decides to play a subsequent hand, than the player owes the current pot a predetermined amount, i.e., the "blind", per hand missed. In one embodiment, if the player decides to sit-out one or more hands, then the system 10 tracks the number of hands missed and automatically deducts an amount equal to the number of hands missed multiplied by the blind once the player decides to play another hand.

As discussed above, the system 10 records every transaction, card dealt or played, wager, etc. . . . in a database. This allows the system 10 to recover from any error and put the game back into the same state.

The system 10 facilitates tournament play. In a tournament, a predetermined number of tables 18 having a predetermined number of players are involved. A buy-in, e.g., $100 is required. Typically, after a player loses all of their money, they are eliminated from the tournament.

Under predetermined rules, players may register for a tournament and be assigned to seats at a table. During play, under predetermined rules, tables may be broken down and the players distributed to other tables. The system 10 facilitates the tournament by providing one or more of the following features:

a) Registration
b) Tracking tournament information
c) display of tournament information on central display and/or remote display
d) tournament set-up, e.g., buy-in
e) Re buy-in
f) tournament jackpot, cash or entry voucher for entry another tournament (specific tournament or expiration date)
g) Process for breaking tables
 (1) message that table is breaking
 (2) convey new seat assignment
 (3) determination of breaking order
 (4) display of breaking order
h) display information on status of other tables and players at other tables
i) System to monitor and adjust hands per hour of an individual table during a tournament: During a poker tournament it is important that each table play roughly the same number of hands per hour as all other tables. This can be accomplished by pausing a game and/or slowing a game down with out pausing.
j) Multi-site tournaments.
k) System for automatically paying players tournament winnings based on tournament pay tables and their final position in the tournament.

17. Automatic posting of blinds and method to turn on and off of automatic posting of blinds/missed blinds.

18. Method for automatically calculating allowed bet amounts in pot-limit and no-limit betting structures.

19. Automatic varying of rake based upon number of players, amount of pot, time of day, type of game and/or other criteria.

20. Ability to offer rake discounts to individual players.

21. Transferring a player from one seat to another at the same table, or to another: Situations exist where are forced to ("must move") or desire to move seats. This feature provides automatic notification and movement of player information from one seat to another.

22. Database and network architecture allowing single and multi-site networking and management of a plurality of automated poker tables.
23. Tracking and reporting of player statistics: Data and method of display over the internet and/or other methods for player to analyze their previous play statistics. In another embodiment date and method of display is utilized to determine player rankings for a given game and/or over a given time period
24. Ability to view available tables and register for live tables and/or tournaments via a remote connection such as the internet or an automated voice response unit.
25. Options adjust speed of play(speed of card shuffling, dealing, discarding, betting, etc etc)
26. Electronically transfer money from an account to the table
27. Electronically transfer money to another
28. Use of "cash card" to bring money to the table.
29. Ability for operator to view details of any and all tables
30. Ability for operator to view details of any and all players In one aspect of the present invention, remote or virtual games may be provided by the system 10. The remote or virtual games may be provided on wireless devices and may be played at predetermined locations.

Virtual games may also be provided through the EPIAs 24. For example, the virtual or remote games may be played by the poker players when it is not their turn. The virtual or remote games may be another poker hand, played against other players, at the table or at other tables, or played against virtual players. Alternatively, the remote or virtual games may be other types of games, including, but not limited to blackjack, keno, slot machines, etc. . . . .

In addition to running other casino games on EPIA 24 or other terminals, system can be run on other gaming devices throughout the casino. For example, a virtual poker game can be run on an existing electronic bingo terminal or an electronic race book terminal.

Figure 13:
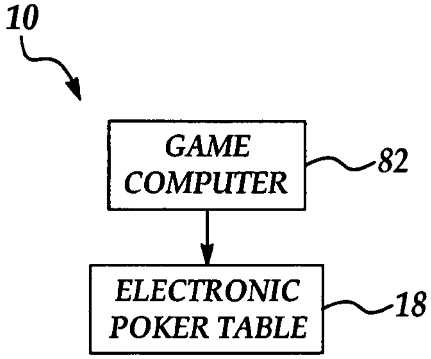
FIG. 13 is a block diagram of a system for playing electronic poker at an electronic poker table, according to an embodiment of the present invention.

With specific reference to FIG. 13, in one aspect of the present invention, the system 10 includes an electronic poker table 18 for providing an electronic poker game to a plurality of players. As discussed above, the electronic poker table 18 may be a stand-alone table, or may be one of a plurality of electronic poker tables 18 located, for example, in a poker room 14 of a casino.

As discussed above, in one embodiment the electronic poker table 18 includes a table top 20 with a playing surface 22 and a plurality of electronic player interaction areas 24 which are located around a periphery of the table top 20. Each electronic player interaction area 24 includes a player interface 54 for interaction with one of the players.

Figure 14:
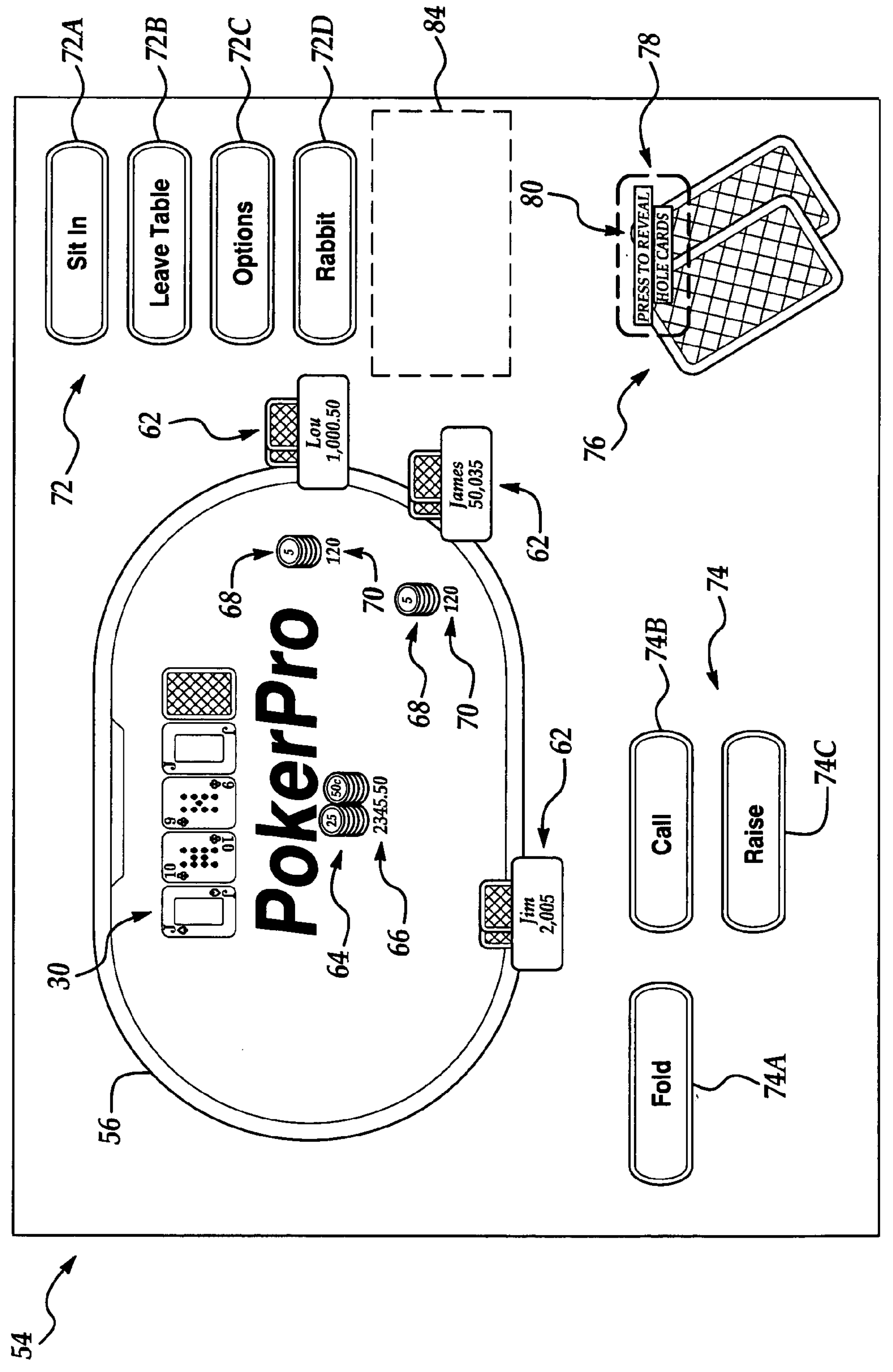
FIG. 14 is a representation of an electronic player interaction area with a rabbit button, according to an embodiment of the present invention.

With specific reference to FIG. 14, the player interface 54 includes providing a rabbit button 72D whose use is described below.

A game computer 82 is coupled to the plurality of electronic player interaction areas 24 for administering at least one hand of the electronic poker game using the virtual cards 76. The game computer 82 may be located at or adjacent the electronic poker table 18 or may be the server computer 30 for a plurality of poker tables 18, as discussed above.

The game computer 82 determines a winner for the at least one hand and awards a pot to the winner. In administering the game, the game computer 82 deals at least one common card and at least one hole, after the winner has been determined, allows any player to view any undealt common cards in response to actuation of the rabbit button 72D.

In one embodiment, the electronic poker game includes a betting round prior to the dealing of the at least one common card. The number of common cards and the manner or order in which they are dealt and the number and timing of betting rounds are specified by the rules of the game being played.

Each player has a turn during a betting round. During each player's turn, the game computer 82 provides the player an opportunity to make a wager or fold. If, during a betting round, all remaining players but one fold, then the remaining player is the winner. If this occurs prior to the dealing of any of the common or community cards, they will remain undealt. If at the end of all betting rounds, more than one player remains, then the winner is determined as a function of the highest poker hand comprised of the community cards and each player's hole cards.

If any particular hand, if any of the community cards remain undealt, then the rabbit button 72D becomes active and/or is displayed.

The rabbit button 72D is active after the winner has been determined and may remain active for a period of time. The time period the rabbit button 72D remains active 72D may be a set time period, for example 30 or 60 seconds, or may be based on a game event. For example, the rabbit button 72D may be active until the next hand is dealt or until the next hand is over.

Figure 17:
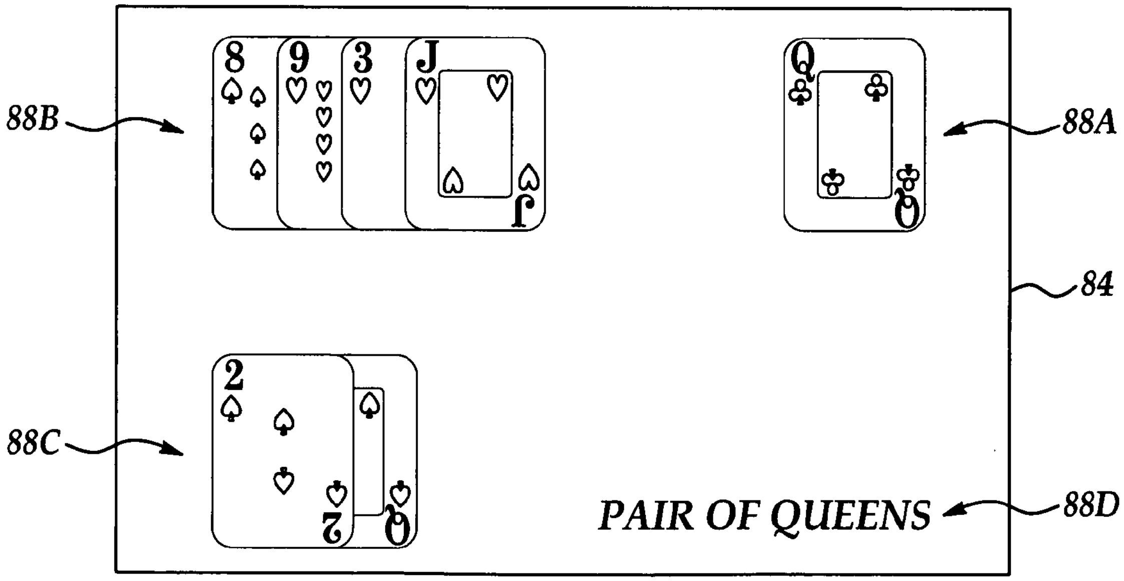

As discussed above, each electronic player interaction area 24 includes a rabbit button 72D. Any one of the players may actuate their respective rabbit button 72D. In one embodiment of the present invention, if one of the players actuates their respective rabbit button 72D, the community cards 88A (see FIG. 17) which were not dealt are displayed in an undealt community card area 84 on the respective electronic player interactive area 24. In another embodiment, if one of the players actuates their respective rabbit button 72, the undealt community cards 88A are displayed in the undealt community card area 84 on all of the electronic player interaction areas.

The undealt community card display area 84 may take up a relatively small portion of the electronic player interaction area 24, as shown. Alternatively, the undealt community card display area 84 may encompass a relatively substantial portion of the electronic player interaction area 24 (and temporarily overlay the rest or a portion of the rest of the electronic player interaction area 24).

The undealt community card display area 84 may be displayed (1) while the rabbit button 72D is depressed, (2) for a predetermined amount of time, e.g., 5 seconds, or (3) until the rabbit button 72D is depressed again.

Figure 15:
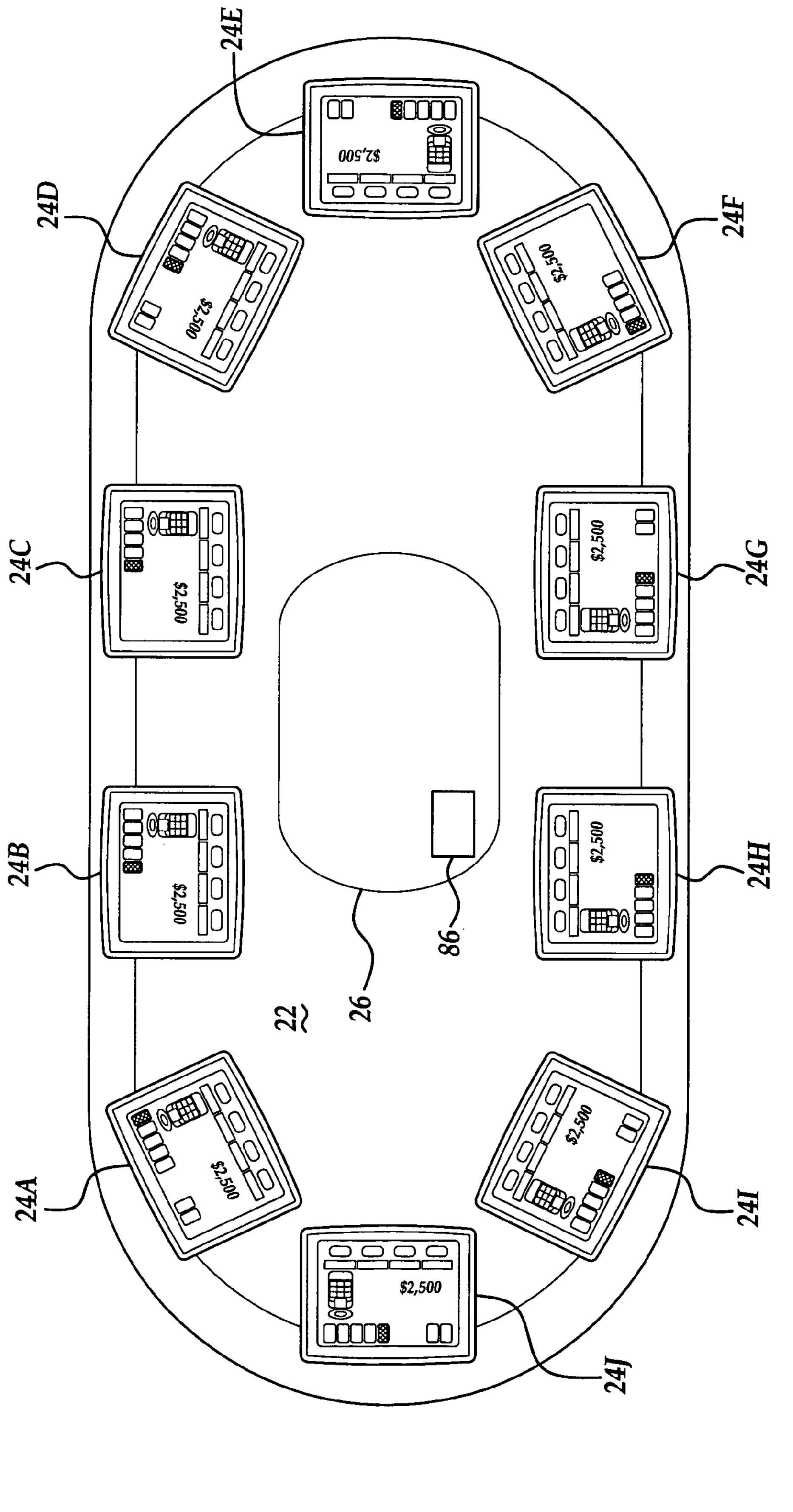
FIG. 15 is a top view of the electronic poker table of FIG. 13.

As discussed above, the electronic poker table 18 may also includes central display area 26 located in a central location of the table top 20 for displaying information to the players. In a third embodiment, as shown in FIG. 15, the undealt community cards may also be displayed in a second undealt community card display area 86 of the central display area 26.

Returning to FIG. 14, upon actuation of the rabbit button 72D by one player, in addition to the undealt community cards 88A, the dealt community cards 88B and/or the player's hole card 88C may also be displayed in the undealt community card area 84. The game computer 82 may also provide an indication 88D of the player's highest hand—if the player had stayed in the hand and the undealt cards 88A had been dealt.

In one embodiment the undealt community cards 88A (and the dealt community cards 88B and the player's hole cards 88C, if displayed), may be displayed using graphical representations of the cards (as shown), or represented by text, e.g., "Two of Hearts" or "2♥".

In one embodiment, the electronic poker game is played using virtual cards and real chips. In another embodiment, the electronic poker game is played using virtual cards and virtual chips.

In a second aspect of the present invention, a method 90 provides an electronic poker game using on a plurality of electronic player interaction areas 24 and a game computer 18. The method may be utilized on an electronic poker table 18 as described above or on any other system for implementing an electronic poker game, such as an internet based game. In an internet based game, the game computer 82 may be a server running the game and the electronic player interaction areas 24 may be implemented on individual computers connected to server through the internet.

Figure 16:
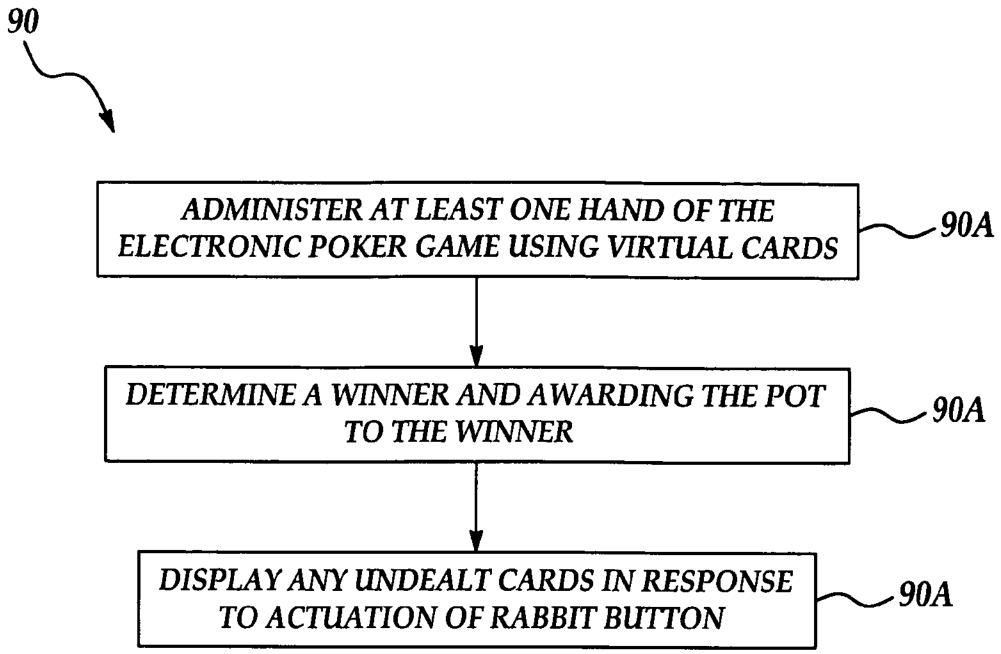
FIG. 16 is a flow diagram of a method for providing an electronic poker game at an electronic poker table, according to an embodiment of the present invention; and, FIG. 17 is a diagrammatic representation of an undealt community card display area according to an embodiment of the present invention.

With particular reference to FIG. 16, in a first step 90A, a hand of the electronic poker game is administered. In a second step 90B, a winner of the hand of the electronic poker game is determined and a pot is awarded to the winner. In a third step 90C, any undealt community cards 88A may be displayed on the electronic player interaction areas 84 of one of the players in response to the player having actuated a respective rabbit button 72D (see above).

Generally, actuation of the rabbit button 72D by one of the players will cause any undealt common or community cards from a just completed or a previous hand to be displayed. If there were no undealt common cards in the previous hands, actuation of the rabbit button 72D would have no function. In this case, the rabbit button 72 may be hidden or not displayed.

The game computer 82 administers the electronic poker game. The electronic poker game is a "flop" type poker game, such as Hold'em or Omaha Poker, in which players are forced to make a betting decision prior to one or more community or common cards being dealt. The following description of operation of the game computer 82 in administering the electronic poker game applies to a variation of Hold'em Poker generally known as Texas Hold'em Poker. However, it should be recognized that the present invention is not limited to any specific version of poker.

At the beginning of each hand of the electronic poker game, a random number generator or RNG (not shown) is used to shuffle a deck of 52 virtual cards and to determine the deck order. One of the players is designated as the dealer. The player on the dealer's left is known as the "Big Blind" and the player on the left of the Big Blind is known as the "Little Blind". At the beginning of the hand, the player known as the Big Blind must post into the pot a predetermined amount, e.g., \$1, \$5, or \$10. This amount is also known as the Big Blind. The player known as the Little Blind must also post into the pot a predetermined amount, typically ½ of the Big Blind. This amount is also known as the Little Blind. Typically, the game computer 82 will automatically deduct the Big Blind and the Little Blind from the respective player's stacks and add them to the pot.

After the blinds have been added to the pot, the game computer 82 will deal two cards, i.e., the players' hole cards, face down to each player. These cards are displayed face down on each players' electronic player interaction area 24. As described above, each player may controllably view their hole cards.

After the hole cards are dealt, the game computer 82 administers a betting round. The first betting round starts with the player on the left of the Little Blind. Generally, each player is given an appropriate set of selections in the form of the game buttons 74. In one embodiment, the game buttons 74 are displayed only during the player's turn. Furthermore, only the game buttons 74 which, according to the rules of the poker game being played, are appropriate are displayed.

After the first betting round, three community cards, i.e., the "flop" are dealt face up by the game computer 82 and displayed. In one embodiment, the community cards are displayed in each electronic player interaction area 24, as shown. If a central display area 26 is used, then the community cards may alternatively or in addition be displayed thereon.

This is followed by a second betting round. After the second betting round, a fourth community card, i.e. the "turn" is dealt by the game computer 82, followed by a third betting round.

After the third betting round, the fifth and final community card, i.e., the "river" is dealt face up. This is followed by the fourth and final betting round. If more than one player remains after the final betting round, the player with the highest hand is determined as the winner of the hand.

If after any of the first through third betting rounds, only one player remains, then the remaining player is automatically determined as the winner. Since one or more of the community cards have not been dealt, the rabbit button 72D on each electronic player interaction area 24 becomes active or is displayed, as described above).

Obviously, many modifications and variations of the present invention are possible in light of the above teachings. The invention may be practiced otherwise than as specifically described within the scope of the appended claims.

ELEMENT LIST

10 system
12 gaming environment
14 specialized or designated poker area, such as a poker room
16 railing
18 electronic poker tables (18A-18J)
20 table top
22 playing surface
24 electronic player interaction areas (24A-24J)
26 common or central display area
28 hole cards
30 common cards
32 touch screen display devices
34 module
36 card reader
38 display (central)
40 poker chairs
42 table base
44 legs
46 rail or bumper
48 Ethernet network
50 server
52 personal computer
54 player interface
56 poker table
58 hand-held device
60 earpiece or headphones
62 user graphic or icon
64 stacks of chips representing the pot
66 number representing the pot total
68 stacks of chips representing the player's contribution to the pot
70 number representing the player's contribution to the pot
72 player option buttons
72A sit in button
72B leave table button
72C options button
74 game buttons
74A fold button
74B call button

74C raise button
76 electronic playing cards or the player's hole cards
76A front side
76B back side
78 predefined location
80 graphic or icon indicating predetermined location on touch screen
82 game computer
84 undealt community card display area
86 second undealt community card display area
88B undealt community cards
88B dealt community cards
88C hole cards
88D highest hand

We claim:

1. A method for providing an electronic poker game on an electronic poker table to a plurality of players, the electronic poker table having a table top and a plurality of electronic player interface areas located around a periphery of the table top, and the method comprising:

associating a first player of the plurality of players with a first electronic player interface area of the plurality of electronic player interface areas;

associating a second player of the plurality of players with a second electronic player interface area of the plurality of electronic player interface areas;

automatically electronically dealing cards, including automatically determining a noncommunity subset of the cards for respectively being electronically displayed on the plurality of electronic player interface areas during a hand of the electronic poker game at the electronic poker table, automatically determining a community subset of the cards for being electronically displayed at the electronic poker table during the hand of the electronic poker game, automatically electronically displaying the noncommunity subset of the cards respectively on the electronic player interface areas during the hand of the electronic poker game, and automatically electronically displaying at least a first community card of the community subset of the cards at the electronic poker table during the hand of the electronic poker game in response to a first predetermined event;

initially not displaying at least a second community card of the community subset of the cards at the electronic poker table during the hand of the electronic poker game, wherein during the hand of the electronic poker game while the first community card is displayed and the second community card is not displayed a value of a hand of the first player is determined by a value of the first community card and values of the cards of the noncommunity subset that are electronically displayed on the first electronic player interface area, and the value of the hand of the first player does not include a value of the second community card, and a value of a hand of the second player is determined by the value of the first community card and values of the cards of the noncommunity subset that are electronically displayed on the second electronic player interface area, and the value of the hand of the second player does not include the value of the second community card;

automatically electronically displaying the second community card at the electronic poker table during the hand of the electronic poker game if a second predetermined event occurs, wherein in response to any occurrence of the second predetermined event during the hand of the electronic poker game the value of the hand of the first player further being determined by the value of the second community card, and the value of the hand of the second player further being determined by the value of the second community card;

automatically activating a plurality of rabbit buttons, which are respectively located at the plurality of electronic player interface areas, in response to a third predetermined event, wherein the third predetermined event comprises the hand of the electronic poker game being completed without occurrence of the second predetermined event so that the second community card is not displayed at the electronic poker table during the hand of the electronic poker game, the hand of the electronic poker game is a preceding hand in that the preceding hand is followed by a next hand of the electronic poker game at the electronic poker table, and the plurality of rabbit buttons remain active into the next hand of the electronic poker game; and electronically displaying the second community card of the preceding hand of the electronic poker game at the electronic poker table during the next hand of the electronic poker game in response to the first player operating an activated rabbit button located at the first electronic player interface area during the next hand of the electronic poker game at the electronic poker table.

2. The method according to claim 1, wherein the step of electronically displaying the second community card of the preceding hand of the electronic poker game at the electronic poker table during the next hand of the electronic poker game, which occurs in response to the first player operating the activated rabbit button located at the first electronic player interface area during the next hand of the electronic poker game, comprises electronically displaying the second community card of the preceding hand of the electronic poker game on each electronic player interface area of the plurality of electronic player interface areas during the next hand of the electronic poker game.

3. The method according to claim 1, wherein the step of electronically displaying the second community card of the preceding hand of the electronic poker game at the electronic poker table during the next hand of the electronic poker game, which occurs in response to the first player operating the activated rabbit button located at the first electronic player interface area during the next hand of the electronic poker game, comprises:

electronically displaying the second community card of the preceding hand of the electronic poker game on the first electronic player interface area during the next hand of the electronic poker game, and not electronically displaying the second community card of the preceding hand of the electronic poker game on the second electronic player interface area during the next hand of the electronic poker game.

4. The method according to claim 1, comprising the plurality of rabbit buttons remaining active until the next hand ends.

5. The method according to claim 1, comprising the plurality of rabbit buttons remaining active for a predetermined period of time.

6. The method according to claim 1, comprising facilitating rabbit hunting, and the facilitating of the rabbit hunting comprising:

the step of electronically displaying the second community card of the preceding hand of the electronic poker game at the electronic poker table during the next hand of the electronic poker game, and the step of electronically displaying the second community card of the preceding hand of the electronic poker game at the electronic poker table during the next hand of the electronic poker game being in response to the first player operating the activated rabbit button located at the first electronic player interface area during the next hand of the electronic poker game at the electronic poker table.

7. The method according to claim 2, comprising the plurality of rabbit buttons remaining active until the next hand ends.

8. The method according to claim 2, comprising facilitating rabbit hunting, and the facilitating of the rabbit hunting comprising:

the step of electronically displaying the second community card of the preceding hand of the electronic poker game at the electronic poker table during the next hand of the electronic poker game, and the step of electronically displaying the second community card of the preceding hand of the electronic poker game at the electronic poker table during the next hand of the electronic poker game being in response to the first player operating the activated rabbit button located at the first electronic player interface area during the next hand of the electronic poker game at the electronic poker table.

9. The method according to claim 3, comprising the plurality of rabbit buttons remaining active until the next hand ends.

10. The method according to claim 3, comprising facilitating rabbit hunting, and the facilitating of the rabbit hunting comprising:

the step of electronically displaying the second community card of the preceding hand of the electronic poker game at the electronic poker table during the next hand of the electronic poker game, and the step of electronically displaying the second community card of the preceding hand of the electronic poker game at the electronic poker table during the next hand of the electronic poker game being in response to the first player operating the activated rabbit button located at the first electronic player interface area during the next hand of the electronic poker game at the electronic poker table.

* * * * *